(12) United States Patent
Manabe et al.

(10) Patent No.: US 6,846,523 B2
(45) Date of Patent: Jan. 25, 2005

(54) LIQUID-CRYSTALLINE MEDIUM

(75) Inventors: Atsutaka Manabe, Bensheim (DE); Matthias Bremer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/794,403

(22) Filed: Mar. 8, 2004

(65) Prior Publication Data

US 2004/0245500 A1 Dec. 9, 2004

(30) Foreign Application Priority Data

Mar. 6, 2003 (DE) .......................... 103 09 775

(51) Int. Cl.[7] .......................... C09K 19/30; C09K 19/12

(52) U.S. Cl. ............... 428/1.1; 252/299.63; 252/299.66

(58) Field of Search ...................... 428/1.1; 252/299.63, 252/299.66

(56) References Cited

U.S. PATENT DOCUMENTS 6,319,570 B1 * 11/2001 Andou et al. ................. 428/1.1
6,399,164 B1 * 6/2002 Yanai et al. .................. 428/1.1
6,764,722 B2 * 7/2004 Klasen et al. ................ 428/1.1
6,790,489 B2 * 9/2004 Klasen-Memmer et al. . 428/1.1

* cited by examiner

*Primary Examiner*—Shean C. Wu
(74) *Attorney, Agent, or Firm*—Millen, White, Zelano, Branigan, P.C.

(57) ABSTRACT

A liquid-crystalline medium of positive dielectric anisotropy and high optical anisotropy, comprising one or more compounds of the formula I

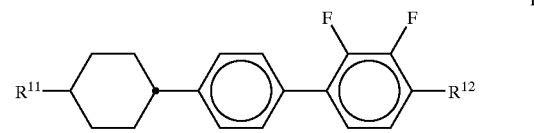

Figure 1:
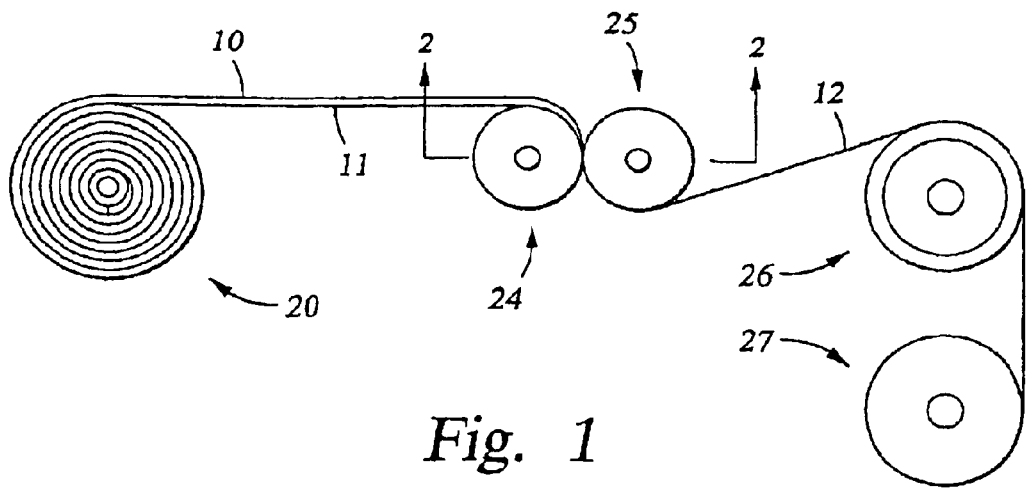
Figure 2:
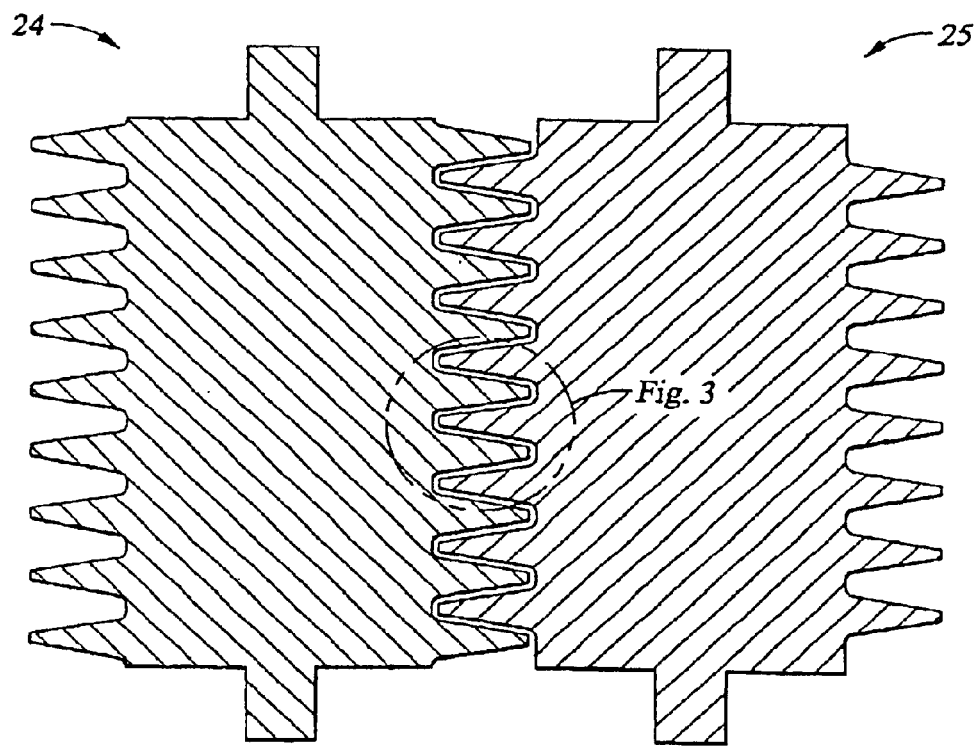
Figure 3:
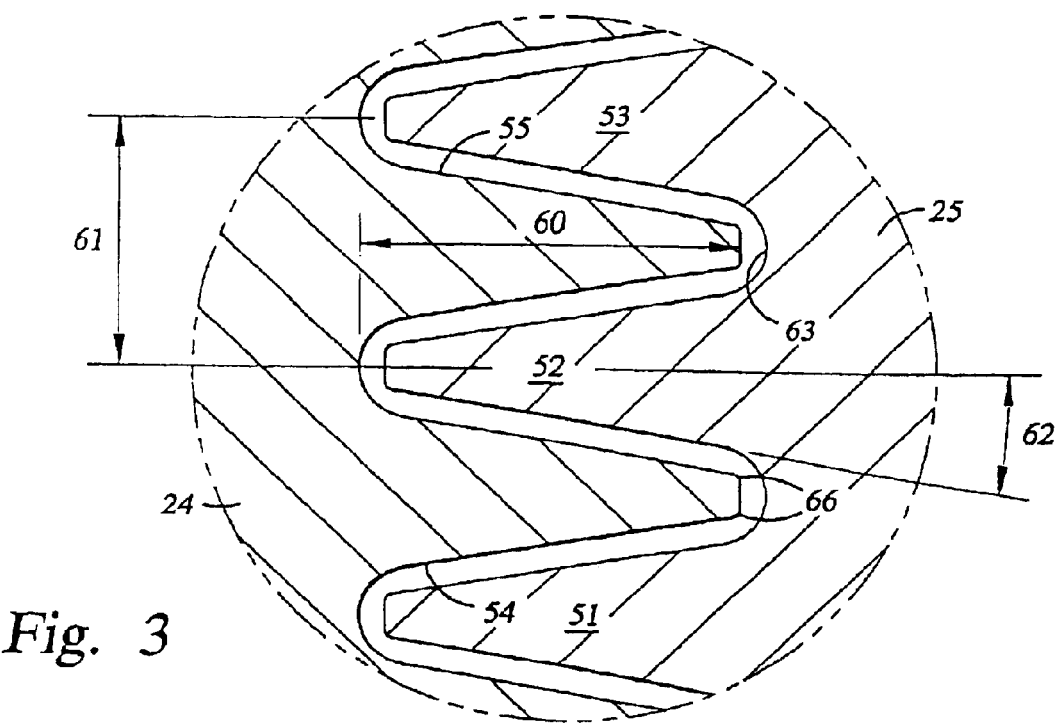
Figure 4:
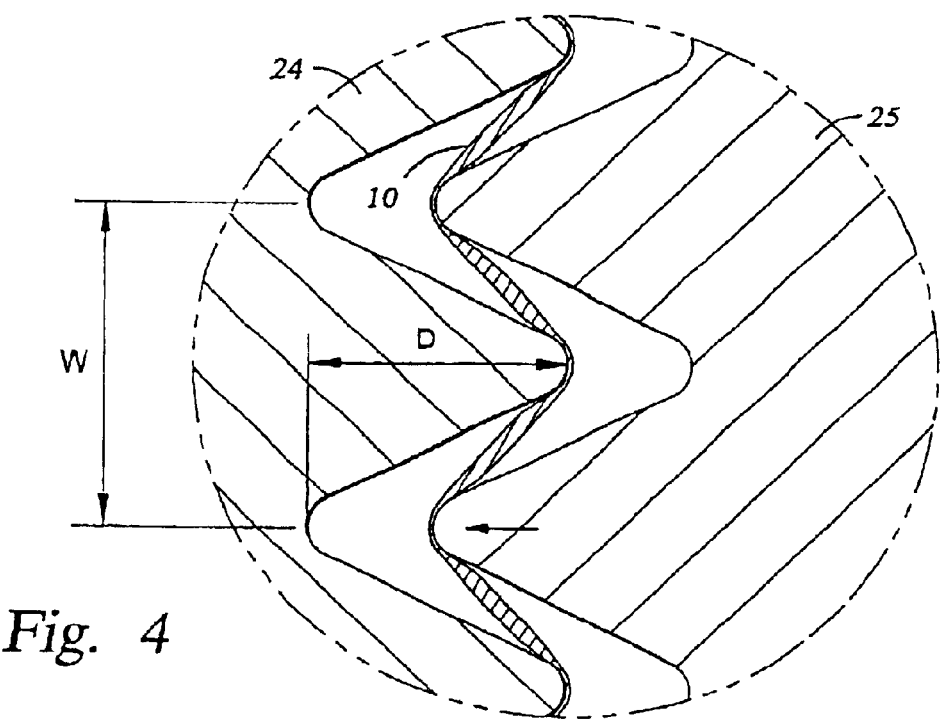

I and one or more compounds of the formulae II and/or III

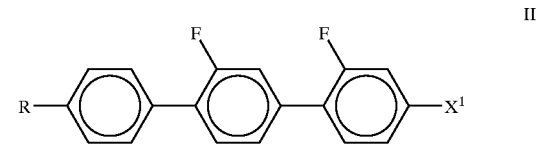

II

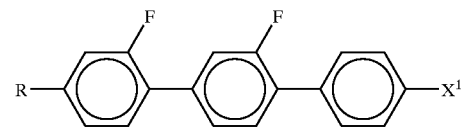

III and its use in electro-optical displays and projection systems, in particular LCoS™ displays and displays based on a birefringence effect, such as OCB displays, is described.

20 Claims, 2 Drawing Sheets

LIQUID-CRYSTALLINE MEDIUM

The invention relates to a liquid-crystalline medium of positive dielectric anisotropy and high optical anisotropy, and to the use thereof in electro-optical displays and projection systems, in particular LCoS™ displays and displays based on a birefringence effect, such as OCB displays.

OCB (optically compensated bend) displays are based on a birefringence effect and contain a liquid-crystal layer having a bend structure. The bend cell, also known as pi cell, was first proposed by P. Bos et al., SID 83 Digest, 30 (1983) for an electrically controllable half-wave plate, whereas the OCB mode for displays was described by Y. Yamaguchi, T. Miyashita and T. Uchida, SID 93 Digest, 277 (1993), and then in papers by T. Miyashita et al. in, inter Alia, Proc. Eurodisplay, 149 (1993), J. Appl. Phys. 34, L177 (1995), SID 95 Digest, 797 (1995), and C.-L. Kuo et al., SID 94 Digest, 927 (1994). An OCB cell comprises a liquid-crystal cell having a bend alignment and a liquid-crystal medium of positive $\Delta\epsilon$. In addition, the OCB displays disclosed in the above papers contain one or more birefringent optical retardation films for eliminating undesired light transmission by the bend cell in the dark state. OCB displays have a number of advantages over conventional displays based on twisted nematic (TN) cells, such as, for example, a wider viewing angle and shorter response times.

The above-mentioned documents have shown that liquid-crystalline phases must have high values for the optical anisotropy $\Delta n$ and a relatively high positive value for the dielectric anisotropy $\Delta\epsilon$ and preferably should have quite low values for the ratio between the elastic constants $K_{33}/K_{11}$ and for the viscosity in order to be usable for high-information display elements based on the OCB effect. The industrial application of the OCB effect in electro-optical displays requires LC phases which have to satisfy a multiplicity of requirements. Particularly important here are chemical resistance to moisture, air and physical effects, such as heat, radiation in the infrared, visible and ultraviolet regions and direct and alternating electrical fields. Furthermore, LC phases which can be used industrially are required to have a liquid-crystalline mesophase in a suitable temperature range, relatively high birefringence, positive dielectric anisotropy and low viscosity.

LCoS™ (liquid crystal on silicon) displays are known from the prior art and are available from Three-Five Systems Inc. (Tempe, Ariz., USA). LCoS™ microdisplays are reflective displays which typically contain a liquid-crystal layer having a twisted nematic structure between a silicon backplane and a cover glass. The silicon backplane is an array of pixels, each of which has a mirrored surface which at the same time acts as electrical conductor. Each pixel comprises a stationary mirror covered by an active liquid-crystal layer having a twisted nematic alignment which can be switched into homeotropic alignment by application of a voltage. LCoS™ microdisplays are small, with a diagonal of typically less than 1.0", but enable high resolutions from 1/4 VGA (78 thousand pixels) to UXGA+(over 2 million pixels).

Owing to the small pixel size, LCoS™ displays also have a very small cell thickness, which is typically about 1 micron. The liquid-crystalline phases used in these displays therefore have to have, in particular, high values for the optical anisotropy $\Delta n$, in contrast to conventional reflective-type LC displays, which usually require LC phases of low $\Delta n$.

None of the series of compounds having a liquid-crystalline mesophase which have been disclosed hitherto includes a single compound which meets all the above-mentioned requirements. Generally, therefore, mixtures of from two to 25, preferably from three to 18, compounds are prepared to give substances which can be used as LC phases. However, ideal phases cannot easily be produced in this way, since liquid-crystal materials having high birefringence at the same time as low viscosity and an adequately high clearing point with a large nematic phase width had hitherto not been made available.

OCB mode and LCoS™ displays can be operated as matrix displays. Matrix liquid-crystal displays (MLC displays) are known. Examples of nonlinear elements which can be used to individually switch the individual pixels are active elements (i.e. transistors). The term "active matrix" is then used, and a differentiation can be made between two types:

1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semi-conductors, such as, for example, CdSe, or TFTs based on poly-crystalline or amorphous silicon. Intensive research efforts are being made worldwide in the latter technology.

The TFT matrix is applied to the inside of one glass plate of the display, while the inside of the other glass plate carries the transparent counterelectrode. Compared with the size of the pixel electrode, the TFT is very small and has virtually no adverse effect on the image. This technology can also be extended to fully color-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are back-lit. In the case of OCB mode displays, however, reflective displays have also been proposed, for example, by T. Uchida, T. Ishinabe and M. Suzuki in SID 96 Digest, 618 (1996).

The term MLC display here covers any matrix display containing integrated nonlinear elements, i.e. in addition to the active matrix, also displays containing passive elements such as varistors or diodes (MIM=metal-insulator-metal).

MLC displays of this type are suitable, inter alia, as displays for notebook computers and in particular for TV applications (for example pocket TV sets) or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. As the resistance decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period.

A disadvantage of the MLC-TN displays disclosed hitherto lies in their comparatively low contrast, the relatively high viewing-angle dependence and the difficulty in producing grey shades in these displays.

Thus, there continues to be a great demand for MLC displays, in particular displays based on a birefringence effect, such as OCB displays, having very high resistivity at the same time as a wide operating temperature range, short response times and low threshold voltage, with the aid of which various grey shades can be produced. Furthermore, there is a great demand for liquid-crystalline media for OCB mode displays which simultaneously exhibit low viscosity, high birefringence, relatively high dielectric anisotropy, a sufficiently high clearing point and a broad nematic phase range.

The invention has an object of providing MLC displays, in particular LCoS™ and reflective displays as well as OCB effect displays, which do not have the above-mentioned disadvantages, or do so only to a reduced extent, and at the same time have low viscosity, high birefringence, positive dielectric anisotropy and a high clearing point.

Upon further study of the specification and appended claims, further objects and advantages of this invention will become apparent to those skilled in the art.

These and other objects can be achieved by the provision of a liquid-crystalline medium based on a mixture of polar compounds of positive dielectric anisotropy, comprising one or more compounds of the formula I

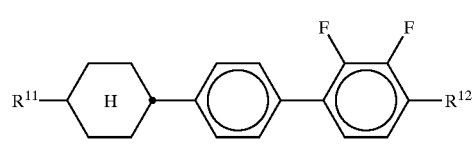

I and one or more compounds of the formulae II and/or III

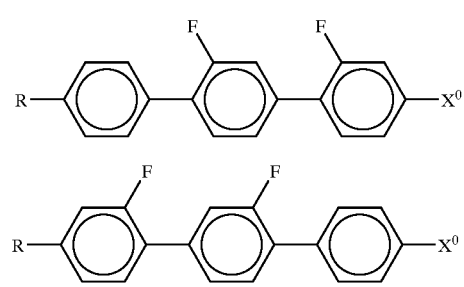

II

III where $R^{11}$ is an alkyl or alkoxy radical having from 1 to 12 carbon atoms or an alkenyl radical having from 2 to 12 carbon atoms;

$R^{12}$ is an alkyl or alkoxy radical having from 1 to 12 carbon atoms or an alkenyl radical having from 2 to 12 carbon atoms;

R is an alkyl radical having from 1 to 12 carbon atoms, in which, in addition, one or more $CH_2$ groups may be replaced by —O—, —S—, —CH=CH—, —C≡C—, —CO—, —OCO— or —COO— in such a way that heteroatoms (—O—, —S—) are not linked directly to one another;

$X^0$ is F, Cl, fluoroalkyl, in particular $CF_3$, or fluoroalkoxy, in particular $OCF_3$, $OCHF_2$, having from 1 to 7 carbon atoms.

The liquid-crystalline media of the present invention are distinguished by a relatively high clearing point, a broad nematic phase range, a high birefringence value, positive dielectric anisotropy, low viscosity, and high UV stability.

On use of the liquid-crystal mixtures according to the invention in electro-optical displays, it is therefore possible to reduce the values for the response time and driving voltage compared with displays containing mixtures in accordance with the prior art and at the same time to achieve displays which offer satisfactory grey shades, a wide viewing angle and high contrast.

It is particularly surprising that the liquid-crystalline media according to the invention have a dielectric anisotropy which is sufficiently high for use in electro-optical displays although the compounds of the formula I themselves have negative values for the dielectric anisotropy.

In connection with the present invention, the term "alkyl"—unless defined otherwise elsewhere in this description or in the claims—denotes a straight-chain or branched aliphatic hydrocarbon radical having from 1 to 12 (i.e. 1, 2, 3, 4, 5, 6, 7, 8, 9, 10, 11 or 12) carbon atoms. If this alkyl radical is a saturated radical, it is also referred to as "alkenyl." It is also possible for one or more $CH_2$ groups in an alkyl radical to be replaced by —O— ("oxaalkyl" or "alkoxy"), —S— ("thioalkyl"), —CH=CH— ("alkenyl"), —C≡C— ("alkynyl"), —CO—, —CO—O— or —O—CO— in such a way that heteroatoms (O and S) are not linked directly to one another. Alkyl is preferably a straight-chain radical having 1, 2, 3, 4, 5, 6, 7 or 8 carbon atoms, in particular methyl, ethyl, n-propyl, n-butyl, n-pentyl, n-hexyl, n-heptyl or n-octyl.

The term "fluoroalkyl" in connection with the present invention denotes an alkyl radical as defined above which is substituted by one or more fluorine atoms. The fluoroalkyl radical preferably has from 1 to 7 carbon atoms. Besides $CF_3$ and $CHF_2$, particularly preferred fluoroalkyl radicals are highly fluorinated alkyl radicals, such as $C_2F_5$, $CHFCF_3$ and $CHFCHF_2$.

The term "alkenyl" denotes an aliphatic hydrocarbon radical having at least one C=C double bond and in connection with the present invention covers straight-chain and branched alkenyl groups having from 2 to 7 (i.e. 2, 3, 4, 5, 6 or 7) or from 2 to 12 (i.e. 2, 3, 4, 5, 6, 7, 8, 9, 10, 11 or 12) carbon atoms respectively, in particular the straight-chain groups. The term "alkenyl" also covers radicals having 2 or more C=C double bonds. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_{7-6}$-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 2-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term alkoxy is taken to mean an O-alkyl radical in which the oxygen atom is bonded directly to the group substituted by the alkoxy radical or to the substituted ring, and alkyl is as defined above and is preferably unbranched.

Correspondingly, an alkenyloxy radical is an O-alkenyl radical in which the oxygen atom is bonded directly to the group substituted by the alkenyloxy radical or to the substituted ring, and alkenyl is as defined above and is preferably unbranched. Preferred alkoxy radicals are methoxy, ethoxy, propoxy, butoxy, pentoxy, hexoxy, heptoxy and octoxy. Alkoxy is particularly preferably —OCH$_3$, —OC$_2$H$_5$, —O-n-C$_3$H$_7$, —O-n-C$_4$H$_9$ or —O-n-C$_5$H$_{11}$.

The term "fluoroalkoxy" in connection with the present invention denotes an alkoxy radical as defined above which is substituted by one or more fluorine atoms. The fluoroalkyl radical preferably has from 1 to 7 carbon atoms. Besides OCF$_3$, OCHF$_2$ and OCH$_2$F, particularly preferred fluoroalkyl radicals are highly fluorinated alkoxy radicals, such as OC$_2$F$_5$, OCHFCF$_3$ and OCHFCHF$_2$.

If one or more CH$_2$ groups in an alkyl radical may, in accordance with the invention, be replaced by —O—, the term "alkyl" also covers "oxaalkyl" radicals. In connection with the present invention, the term "oxaalkyl" denotes alkyl radicals and the term "oxaalkenyl" denotes alkenyl radicals in which at least one non-terminal CH$_2$ group has been replaced by —O— in such a way that no adjacent heteroatoms (O and S) are present. Oxaalkyl preferably covers straight-chain radicals of the formula —C$_a$H$_{2a+1}$—O—(CH$_2$)$_b$—, where a and b are each, independently of one another, 1, 2, 3, 4, 5, 6, 7, 8, 9 or 10; a is particularly preferably an integer from 1 to 6, and b is 1 or 2.

If one or more CH$_2$ groups in an alkyl radical as defined above have been replaced by sulfur, a "thioalkyl" radical is present. "Thioalkyl" preferably covers a straight-chain radical of the formula C$_a$H$_{2a+1}$—S—(CH$_2$)$_b$—, where a is 1, 2, 3, 4, 5, 6, 7, 8, 9 or 10, and b is 0, 1, 2, 3, 4, 5, 6, 7, 8, 9 or 10; a is particularly preferably an integer from 1 to 6, and b is 0, 1 or 2.

If one or more CH$_2$ groups in an alkyl radical or alkenyl radical have been replaced by —C≡C—, an alkynyl radical or alkenynyl radical is present. Replacement of one or more CH$_2$ groups by —CO—, —CO—O— or —O—CO— is also possible. The following of these radicals are preferred here: acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl or 4-methoxy-carbonyl)butyl.

If the said radicals have at least one center of asymmetry, for example an asymmetrically substituted carbon atom, they can be in the form of optically active (chiral) radicals. It goes without saying that compounds containing chiral radicals of this type can exist in isomerically pure form or in the form of a mixture of the optical isomers.

Preferred compounds of the formula I are those for which R$^{12}$ is an alkoxy radical having from 1 to 7 carbon atoms. Particularly preferred compounds of the formula I are those of the formulae Ia to Ic

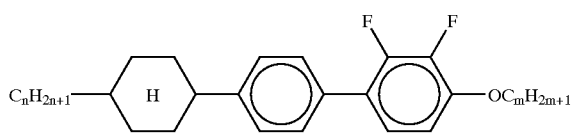

Ia

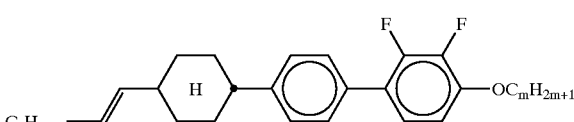

Ib

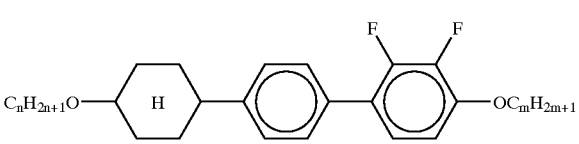

Ic

In these formulae, n and m, independently of one another, are an integer from 1 to 7, in particular from 1 to 5, and C$_n$H$_{2n+1}$ and C$_m$H$_{2m+1}$ are, in particular, unbranched.

Very particularly preferred compounds of the formula I are those of the formula Ia in which n=1, 2, 3, 4 or 5 and m=1, 2 or 3.

The compounds of the formula I have negative values of the dielectric anisotropy and are preferably present in the liquid-crystalline medium according to the invention in an amount of from 1 to 20% by weight (based on the total amount of the medium), more preferably from 2 to 15% by weight and in particular from 3 to 12% by Regarding compounds of the formulae II and III, it is preferred for X$^0$ to be X$^1$, where x$^1$ is F or Cl.

Preferred compounds of the formula II are those of the formula IIa

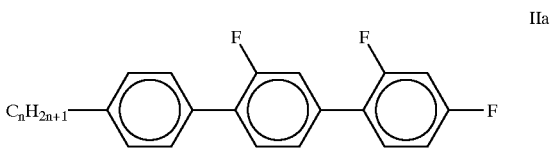

IIa

In this formula, n is an integer from 1 to 7, preferably from 1 to 5; in particular, C$_n$H$_{2n+1}$ is methyl, ethyl, n-propyl, n-butyl or n-pentyl.

Preferred compounds of the formula III are those of the formula IIIa

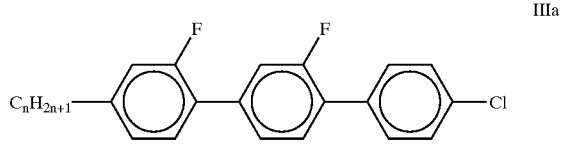

IIIa

In this formula, n is an integer from 1 to 7, preferably from 1 to 5; in particular, C$_n$H$_{2n+1}$ is methyl, ethyl, n-propyl, n-butyl or n-pentyl.

The compounds of the formulae II and III have high values for the optical anisotropy. The media according to the invention may comprise one or more compounds of the formula II or exclusively of one or more compounds of the formula III or alternatively comprise one or more compounds of the formula II and one or more compounds of the formula III. It is preferred for one or two compounds of the formula II and/or one or two compounds of the formula III to be present. Compounds of the formulae II and/or III are preferably present in the medium according to the invention in an amount of from 5 to 55% by weight (based on the total amount of the medium), more preferably from 10 to 50% by weight and in particular from 15 to 45% by weight.

It is furthermore preferred for the liquid-crystalline medium according to the invention to comprise one or more compounds of the formula IV:

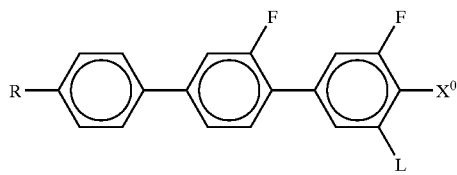

IV where

R is an alkyl radical having from 1 to 12 carbon atoms, in which, in addition, one or more $CH_2$ groups may be replaced by —O—, —S—, —CH=CH—, —C≡C—, —CO—, —OCO— or —COO— in such a way that heteroatoms (—O—, —S—) are not linked directly to one another;

$X^0$ is F, Cl, fluoroalkyl, in particular $CF_3$, or fluoroalkoxy, in particular $OCF_3$ or $OCHF_2$, having from 1 to 7 carbon atoms; and L is H or F.

Preferred compounds of the formula IV are those for which $X^0$ is F, Cl or $OCF_3$. Particular preference is given here to the compounds of the formulae IVa to IVe

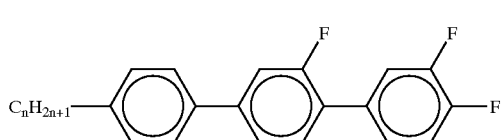

IVa

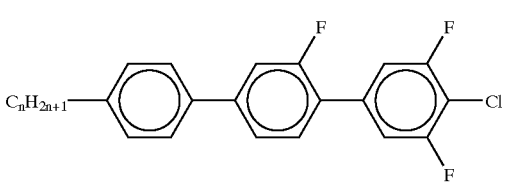

IVb

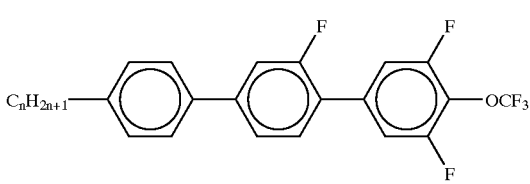

IVc

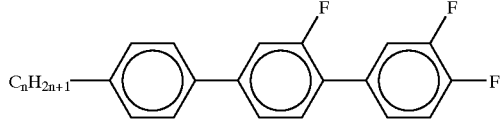

IVd

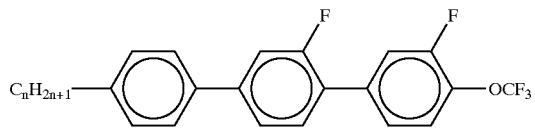

IVe

In these formulae, n is an integer from 1 to 7, preferably from 1 to 5; in particular, $C_n^HH_{2n+1}$ is methyl, ethyl, n-propyl, n-butyl or n-pentyl. Particular preference is given to the compounds of the formulae IVa to IVc, i.e. compounds of the formula IV in which L is F. Very particular preference is given to the compounds of the formula IVa, in particular those in which $C_nH_{2n+1}$ is ethyl, n-propyl or n-pentyl.

The compounds of the formula IV have high values for the optical anisotropy and for the dielectric anisotropy. The media according to the invention can comprise one or more, in particular one, two or three, compounds of the formula IV. It is preferred for the content of the compound(s) of the formula IV in the liquid-crystalline medium according to the invention to be from 3 to 40% by weight, particularly preferably from 4 to 36% by weight and in particular from 5 to 32% by weight.

It is furthermore preferred for the liquid-crystalline medium according to the invention to comprise one or more compounds of the formula V:

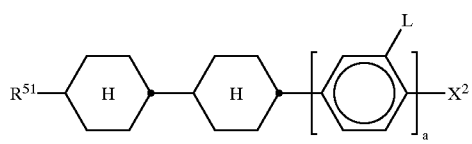

V where $R^{51}$ is an alkenyl radical having from 2 to 12 carbon atoms;

$X^2$ is an alkyl or alkoxy radical having from 1 to 12 carbon atoms or an alkenyl or alkenyloxy radical having from 2 to 12 carbon atoms, in which, in addition, one or more $CH_2$ groups may be replaced by —O—, —S—, —C≡C—, —CO—, —OCO— or —COO— in such a way that heteroatoms (—O—, —S—) are not linked directly to one another, or is $X^0$, where $X^0$ is as defined above;

a is 0 or 1; and

L is H or F.

A preferred sub-group of compounds of the formula V comprises compounds of the formula V-A:

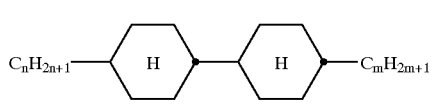

V-A

In this formula, n is an integer from 1 to 7, while m is an integer from 2 to 7. $C_nH_{2n+1}$ is preferably an unbranched alkyl radical, in particular methyl, ethyl, n-propyl, n-butyl or n-pentyl. $C_mH_{2m+1}$ is preferably an unbranched alkenyl radical, in particular vinyl, 1E-propenyl or 2-propenyl.

Particularly preferred compounds of the formula V-A are those of the formula V-Aa:

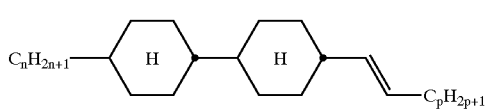

V-Aa $C_nH_{2n+1}$ is a straight-chain alkyl radical in which n=3, 4 or 5, and p is 0, 1 or 2.

Two further preferred sub-groups of compounds of the formula V are formed by compounds of the formulae V-B and V-C:

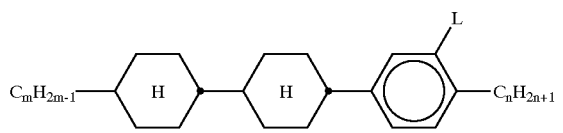

V-B

V-C

In these formulae, n is an integer from 1 to 7, while m is an integer from 2 to 7, and L is H or F. $C_nH_{2n+1}$ is preferably an unbranched alkyl radical, in particular methyl, ethyl, n-propyl, n-butyl or n-pentyl. $C_mH_{2m-1}$ is preferably an unbranched alkenyl radical, in particular vinyl, 1E-propenyl or 2-propenyl. L is preferably hydrogen in the formula V-B and in the formula V-C.

Particularly preferred compounds of the formulae V-B and V-C are those of the formulae V-Ba and V-Ca respectively:

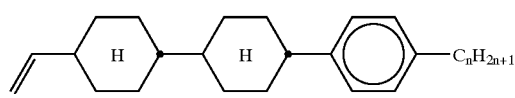

V-Ba

V-Ca where $C_n^H{}_{2n+1}$ is a straight-chain alkyl radical in which n=1, 2 or 3.

Regarding compounds of the formula V, the liquid-crystalline media according to the invention may comprise compounds of the formula V-A or compounds of the formula V-B or compounds of the formula V-C. However, they may also comprise both compounds of the formula V-A and of the formula V-B and/or of the formula V-C. The content of the compounds of the formula V in the liquid-crystal medium according to the invention is preferably from 1 to 30% by weight, particularly preferably from 3 to 28% by weight, in particular from 5 to 26% by weight.

It is furthermore preferred for the liquid-crystalline media according to the invention to comprise one or more compounds of the formula VI:

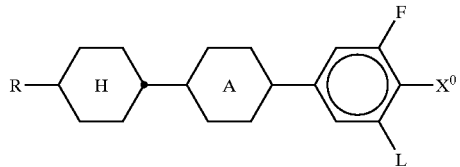

VI where is a 1,4-cyclohexylene or 1,4-phenylene ring, where the phenylene ring may also be substituted by 1 or 2 fluorine atoms;

R and $X^0$ are as defined above; and

L is H or F.

Preferred sub-groups of compounds of the formula VI are formed by compounds which are represented by the formulae VI-A and VI-B:

VI-A

VI-B

In these formulae, n is an integer from 1 to 7, preferably from 1 to 5; in particular, $C_nH_{2n+1}$ is methyl, ethyl, n-propyl, n-butyl or n-pentyl. $X^0$ is preferably F, Cl, $CF_3$, $OCF_3$ or $OCHF_2$, in particular F, $CF_3$ or $OCF_3$. L is H or F.

If compounds of the formula VI are present in the media according to the invention, their content is usually from 4 to 30% by weight, preferably from 8 to 26% by weight and in particular from 12 to 22% by weight.

It is furthermore preferred for the media according to the invention to comprise, as polar constituent of high optical anisotropy, one or more compounds of the formula VII:

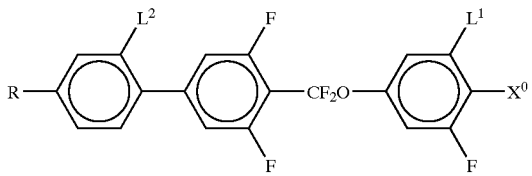

VII where
R is as defined above;
$X^0$ is F, Cl, fluoroalkyl, in particular $CF_3$, or fluoroalkoxy, in particular $OCF_3$ or $OCHF_2$, having from 1 to 7 carbon atoms; and
$L^1$ and $L^2$, independently of one another, are H or F.

$X^1$ in the formula VII is preferably F, Cl or $OCF_3$.

Preferred compounds of the formula VII are those of the formulae VIIa to VIIf:

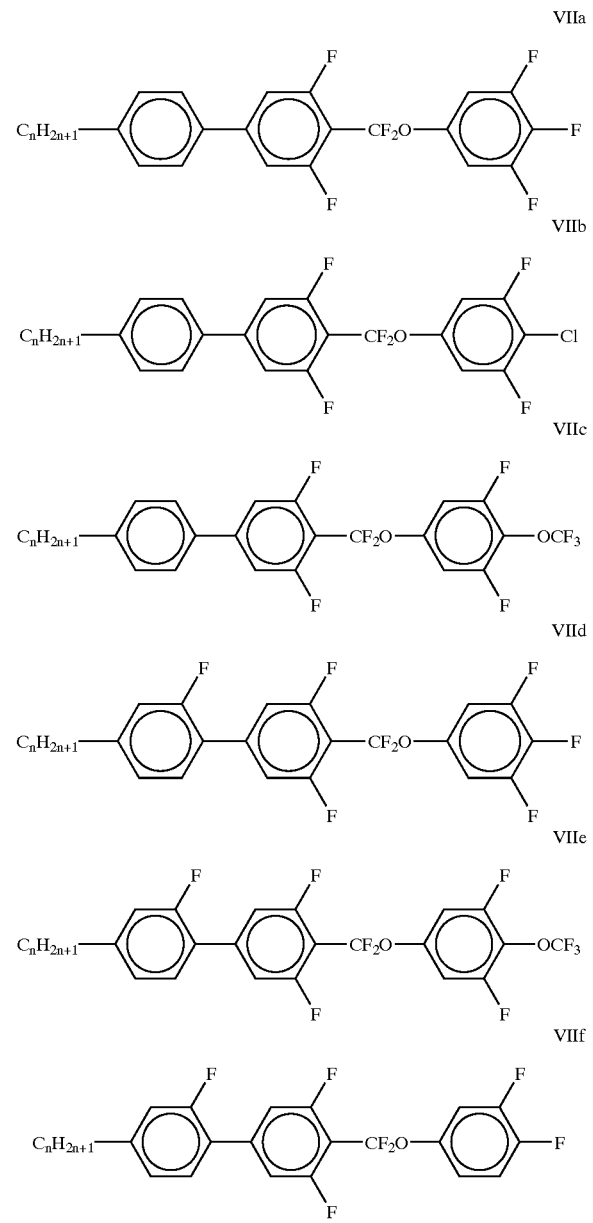

In these formulae, n is an integer from 1 to 7, preferably from 1 to 5; $C_nH_{2+1}$ in particularly preferably methyl, ethyl, n-propyl, n-butyl or n-pentyl, in particular ethyl or n-Very propyl. Very particular preference is given to compounds of the formula VIIa.

If compounds of the formula VII are present in the media according to the invention, their content is usually from 2 to 40% by weight, preferably from 5 to 35% by weight and in particular from 10 to 25% by weight.

The liquid-crystal media according to the invention may also comprise biphenyl compounds containing an alkenyl radical, of the formula VIII

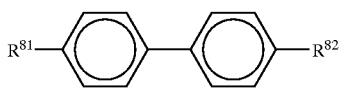

VIII where
$R^{81}$ is alkyl or alkoxy having from 1 to 12 carbon atoms; and
$R^{82}$ is alkenyl having from 2 to 7 carbon atoms.

Preference is given to compounds of the formula VIII in which $R^{81}$ is alkyl having from 1 to 8 carbon atoms. $R^{8'}$ is particularly preferably methyl, ethyl or propyl, in particular methyl.

Preference is furthermore given to compounds of the formula VIII in which $R^{82}$ is vinyl, 1E-propenyl, 1E-butenyl, 3-butenyl or 3E-pentenyl, in particular 3-butenyl or 3E-pentenyl.

Very particular preference is given to compounds of the formula VIIIa

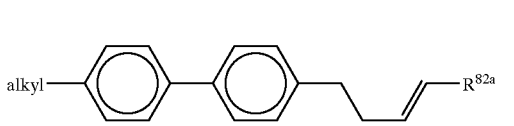

VIIIa in which alkyl is an alkyl group having from 1 to 8 carbon atoms, in particular methyl, and $R^{82a}$ is H, methyl, ethyl or n-propyl, in particular methyl.

The liquid-crystal mixture preferably additionally comprises one or more terphenyl compounds of the formula IX

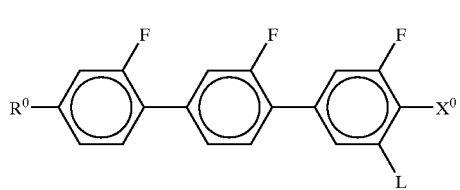

IX where
$R^0$ is an alkyl or alkoxy radical having from 1 to 12 carbon atoms;
$X^0$ is F, Cl, fluoroalkyl, in particular $CF_3$, or fluoroalkoxy, in particular $OCF_3$ or $OCHF_2$, having up to 7 carbon atoms; and
L is H or F.

Preference is given to compounds of the formula IX in which $X^0$ is $X^1$, i.e. is F or Cl.

The liquid-crystal mixture preferably additionally comprises one or more polar compounds selected from the formulae X to XVIII:

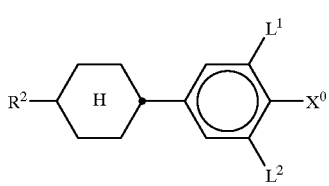

X

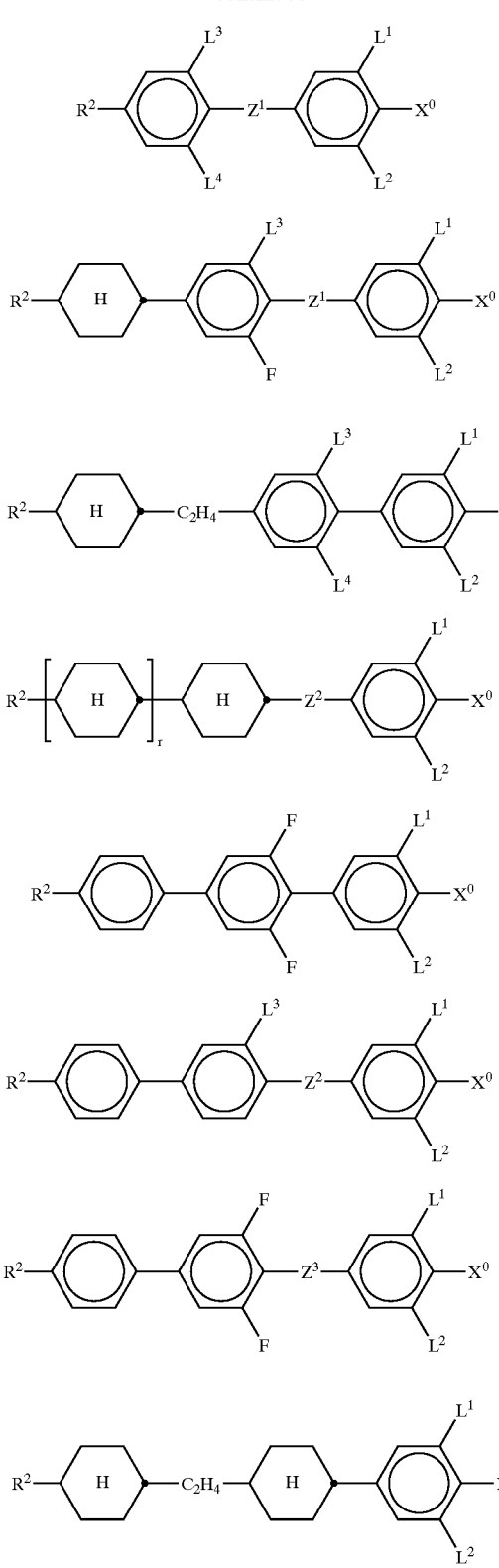

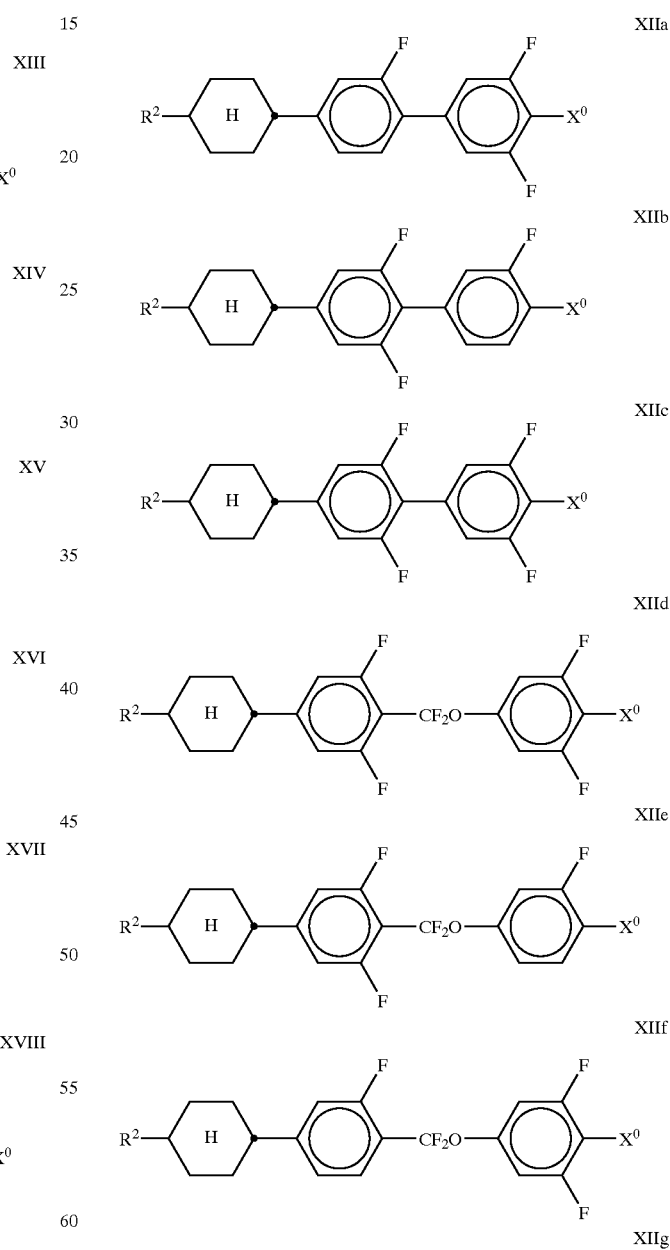

where
R² is alkyl, alkoxy, fluoroalkyl, alkenyl, alkenyloxy or oxaalkenyl having up to 9 carbon atoms;
Z¹ is $CF_2O$, $C_2F_4$ or a single bond;
Z² is $CF_2O$, $C_2F_4$ or $C_2H_4$;
Z³ is $C_2F_4$ or $C_2H_4$;
X⁰ is F, Cl, fluoroalkyl, in particular $CF_3$, or fluoroalkoxy, in particular $OCF_3$ or $OCHF_2$, having up to 7 carbon atoms;
L¹ to L⁴ are each, independently of one another, H or F, and
r is 0 or 1.

In the compounds of the formula X, R² is preferably n-alkyl having from 1 to 8 carbon atoms or alkenyl having from 2 to 7 carbon atoms, while X⁰ is preferably F, Cl, $CF_3$, $OCF_3$ or $OCHF_2$, in particular F or $OCF_3$.

The compounds of the formula XII are preferably selected from the compounds of the following formulae:

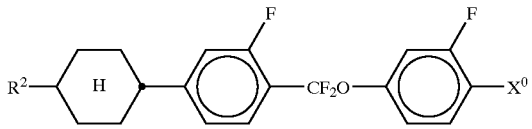

-continued

XIIh
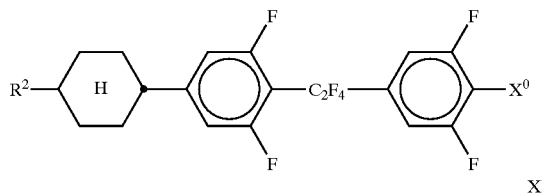

XIIj
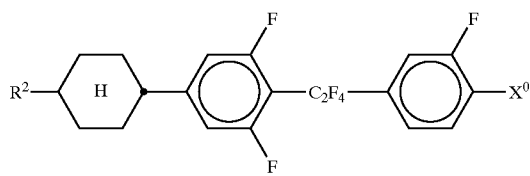

XIIk
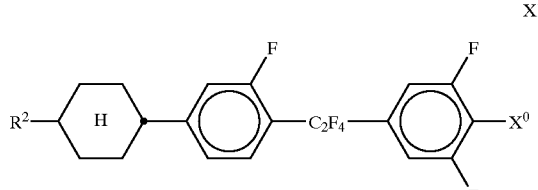

XIIm
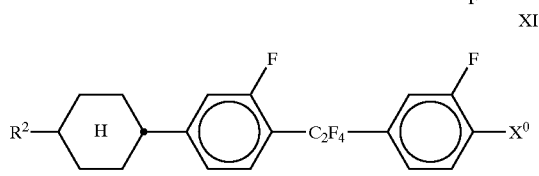

where $R^2$ and $X^0$ are as defined above, $R^2$ is preferably n-alkyl having from 1 to 8 carbon atoms or alkenyl having from 2 to 7 carbon atoms, and $X^0$ is preferably F, Cl, $CF_3$, $OCF_3$ or $OCHF_2$, in particular F or $OCF_3$.

Particular preference is given to compounds of the formula XIIa, in particular those in which $X^0$ is F, and to compounds of the formula XIId.

The compounds of the formula XIV are preferably selected from the following formulae:

XIVa
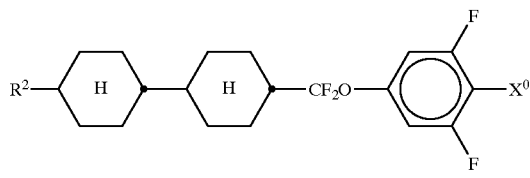

XIVb

XIVc

-continued

XIVd
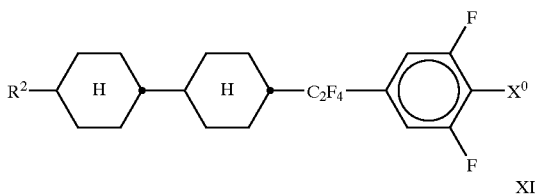

XIVe
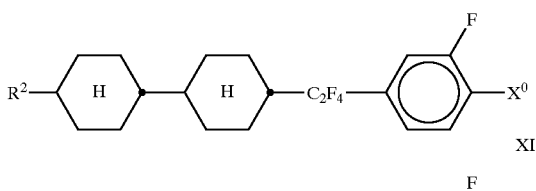

XIVf
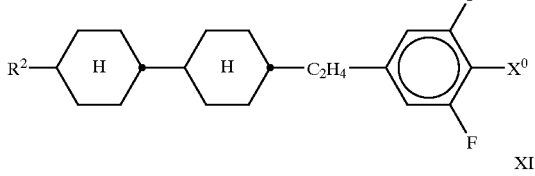

XIVg
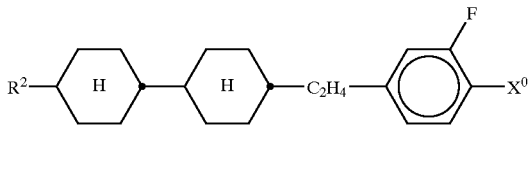

in which $R^2$ and $X^0$ are as defined above, $R^2$ is preferably n-alkyl having from 1 to 8 carbon atoms or alkenyl having from 2 to 7 carbon atoms, and $X^0$ is preferably F, Cl, $CF_3$, $OCF_3$ or $OCHF_2$, in particular F or $OCF_3$.

Particular preference is given to compounds of the formulae XIVa, XIVb and XIVc.

The compounds of the formula XVI are preferably selected from compounds of the following formulae:

XVIa
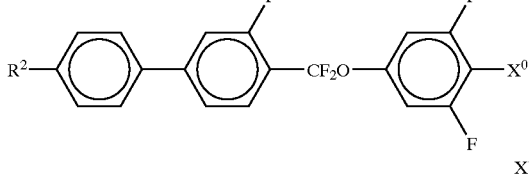

XVIb
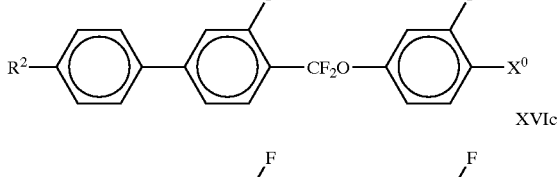

XVIc
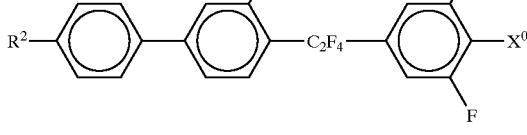

XVId

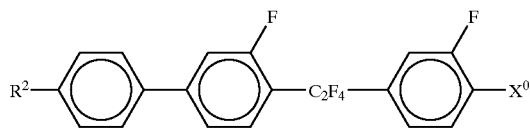

in which R² and X⁰ are as defined above, R² is preferably n-alkyl having from 1 to 8 carbon atoms or alkenyl having from 2 to 7 carbon atoms, and X⁰ is preferably F, Cl, $CF_3$, $OCF_3$ or $OCHF_2$, in particular F or $OCF_3$.

The compounds of the formula XVII are preferably selected from compounds of the following formulae:

XVIIa

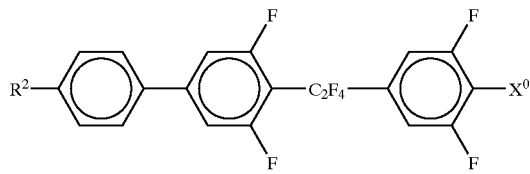

XVIIb

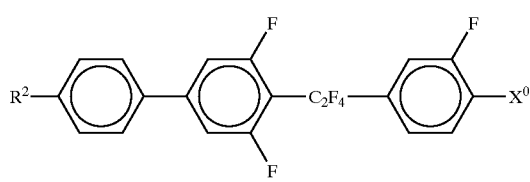

in which R² and X⁰ are as defined above, R² is preferably n-alkyl having from 1 to 8 carbon atoms or alkenyl having from 2 to 7 carbon atoms, and X⁰ is preferably F, Cl, $CF_3$, $OCF_3$ or $OCHF_2$, in particular F or $OCF_3$.

The liquid-crystal mixture preferably additionally comprises one or more tetracyclic compounds of the formulae XIX to XXVI:

XIX

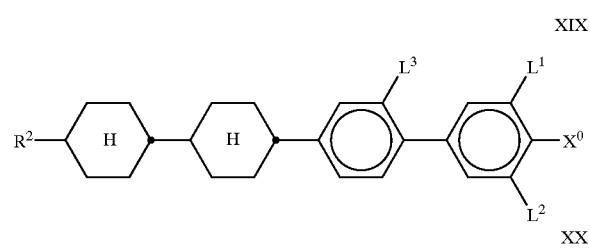

XX

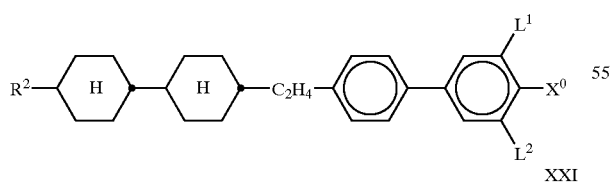

XXI

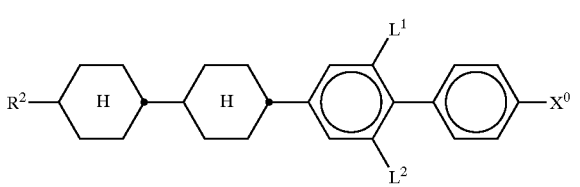

XXII

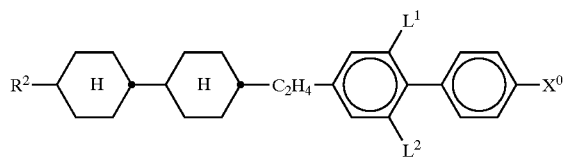

XXIII

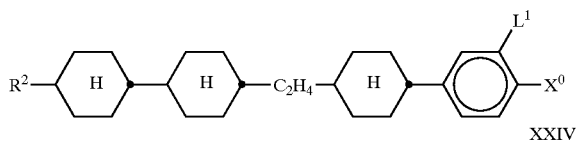

XXIV

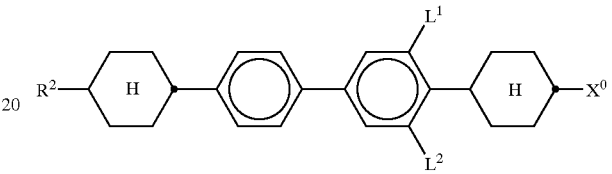

XXV

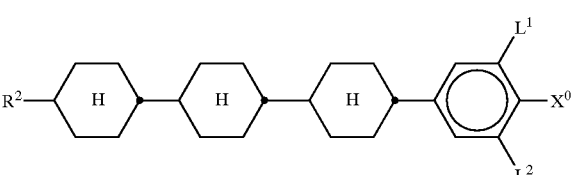

XXVI

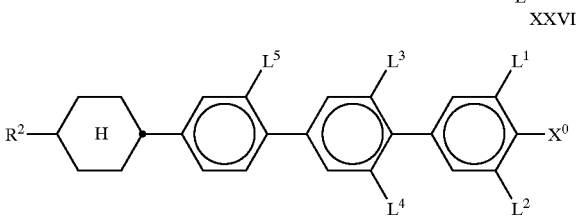

in which R² and X⁰ are as defined above, and L¹, L², L³, L⁴ and L⁵ are each, independently of one another, H or F. R² is preferably n-alkyl having from 1 to 8 carbon atoms or alkenyl having from 2 to 7 carbon atoms. X⁰ is preferably F, Cl, $CF_3$, $OCF_3$ or $OCHF_2$, in particular F or $OCF_3$. L⁴ and L⁵ are preferably H. Particular preference is given to compounds of the formula XXVI in which L¹ and L³ are F, L² is H or F, and L⁴ and L⁵ are H.

The liquid-crystal mixture preferably additionally comprises one or more compounds of the formulae XXVII to XXIX:

XXVII

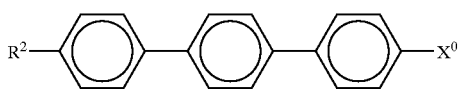

XXVIII

XXIX

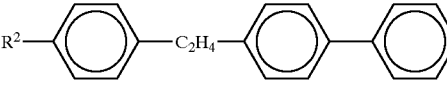

in which $R^2$, $L^1$ and $X^0$ are as defined above, and the phenylene rings are optionally monosubstituted or polysubstituted by F, Cl or CN. $R^2$ is preferably n-alkyl having from 1 to 8 carbon atoms or alkenyl having from 2 to 7 carbon atoms, and $X^0$ is preferably F, Cl, $CF_3$, $OCF_3$ or $OCHF_2$, in particular F or Cl, and at least one phenylene ring is preferably substituted by F.

Preferred compounds of the formula XXVIII are those in which $L^1$ is F and $X^0$ is F or Cl, in particular F.

The liquid-crystal mixture preferably additionally comprises one or more compounds of the formulae XXX to XXXIII:

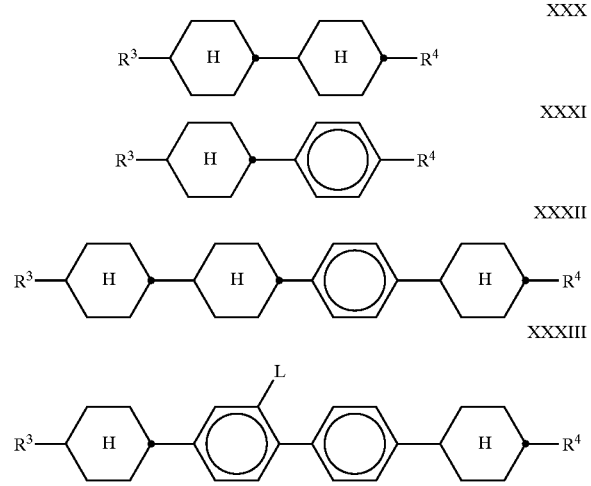

in which $R^3$ and $R^4$ are each, independently of one another, as defined for $R^{8'}$ under the formula VIII, and L is H or F.

In the compounds of the formula XXX, $R^3$ and $R^4$ are preferably alkyl having from 1 to 8 carbon atoms.

In the compounds of the formulae XXXI, XXXII and XXXIII, $R^3$ and $R^4$ are preferably alkyl or alkoxy having from 1 to 8 carbon atoms.

The invention furthermore relates to an electro-optical display or a projection system, preferably a display having active-matrix addressing based on the OCB effect or an LCoS™ display, characterized in that it contains, as dielectric, a liquid-crystalline medium described above.

The mixture preferably essentially consists of compounds selected from the group consisting of the general formulae I, II and III as well as IV to XXXIII.

Preferred embodiments of the present invention relate, inter alia, to mixtures comprising:
  at least one compound of the formula I, in particular of the formula Ia; and/or
  from 5 to 30% by weight of at least one compound of the formula IIa; and/or
  from 5 to 50% by weight of at least one compound of the formula IIIa; and/or
  from 5 to 20% by weight of at least one compound of the formula V-A; and/or
  up to 10% by weight of one or more compounds of the formula V-B; and/or
  up to 20% by weight, in particular up to 15% by weight, of one or more compounds of the formula V-C; and/or
  from 6 to 24% by weight of at least one compound of the formula VI-B; and/or
  from 5 to 20% by weight of at least one compound of the formula VIIa; and/or
  from 1 to 30% by weight of one or more compounds of the formula VIIIa, in particular in which $R^{82a}$=methyl; and/or
  up to 20% by weight of one or more tetracyclic compounds of the formulae XIX to XXVI and XXXII and XXXIII, in particular of the formulae XIX and XXXIII.

The compounds of the formulae I to XXXIII used in the liquid-crystalline media according to the invention are known from the prior art or can be prepared by known processes.

The use of the compounds of the formula I enables liquid-crystalline mixtures according to the invention to be obtained which at the same time have high birefringence and a high clearing point without impairment of the other parameters. The use of the compounds of the formulae II and/or III results in high birefringence values in the mixtures according to the invention.

The liquid-crystal mixture preferably has a nematic phase range of at least 75 K and a clearing point above 60° C., in particular above 70° C.

The birefringence Δn in the liquid-crystal mixture is preferably at least 0.14, particularly preferably at least 0.15, in particular 0.18 or more. The dielectric anisotropy is preferably greater than +6, particularly preferably at least +7.5.

The mixtures in accordance with the present invention are usually based on medium-polarity components containing the stated parent structure and further components which are not cyano components. However, mixtures of this type may of course additionally also comprise known cyano-LC components, preferably compounds of the formula XXXIV

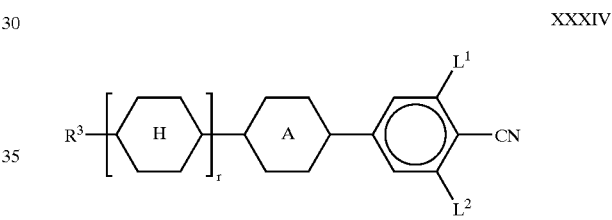

in which $R^2$, r, $L^1$ and $L^2$ are as defined above, and

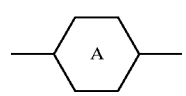

is trans-1,4-cyclohexylene or 1,4-phenylene, if very high HR values are not necessary, for example for TN or STN use. The mixtures obtained are important for achieving very broad nematic phase ranges, including very low temperatures (outdoor use).

The mixtures are preferably based on medium-polarity halogenated components and/or are essentially free from cyano components.

The mixtures according to the invention are prepared in a manner which is conventional per se. In general, the desired amount of the components used in lesser amount is dissolved in the components making up the principal constituent, advantageously at elevated temperature. If the selected temperature is above the clearing point of the principal constituent, completion of the dissolution operation can be observed particularly easily.

However, it is also possible to mix solutions of the components in a suitable organic solvent, for example acetone, chloroform or methanol, and to distil off the solvent.

The liquid-crystal phases according to the invention can be modified by means of suitable additives in such a way that they can be employed in any type of AM display which has been disclosed hitherto.

The media according to the invention may, if desired, comprise further additives, for example stabilizers or dichroic dyes, in usual concentrations. The total concentration of these further constituents is in the range from 0% to 10%, preferably in the range from 0.1% to 6%, based on the mixture as a whole. The concentrations of the individual compounds of these are in the range from 0.1% to 3%. The concentrations of these additives and similar constituents of the mixture are not taken into account when indicating the concentration ranges of the other mixture constituents.

The entire disclosure of all applications, patents and publications, cited herein and of corresponding German application No. 10309775.9, filed Mar. 6, 2003 is incorporated by reference herein.

The following examples serve to illustrate the invention without restricting it. In the examples, the melting point and clearing point of a liquid-crystal substance are indicated in degrees Celsius. The percentages are percent by weight.

In the present patent application and in the following examples, all chemical structures of the LC compounds are indicated by means of acronyms, with the transformation into chemical formulae taking place as indicated below. All radicals $C_nH_{2n+1}$ and $C_nH_{2m+1}$ are straight-chain alkyl radicals having n and m carbon atoms respectively. The coding in Table B is self-evident. In Table A, only the acronym for the parent structure is indicated. In individual cases, the acronym is followed, separated by a dash, buy a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_2H_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| n-V | $C_nH_{2n+1}$ | —CH=CH$_2$ | H | H |
| V-m | —CH=CH$_2$ | $C_mH_{2m+1}$ | H | H |
| V-F | CH$_2$=CH— | F | H | H |
| nS | $C_nH_{2n+1}$ | NCS | H | H |
| rVsN | $C_rH_{2r+1}$—CH=CH—C$_s$H$_{2s}$— | CN | H | H |
| rEsN | $C_rH_{2r+1}$—O—C$_s$H$_{2s}$— | CN | H | H |
| nAm | $C_nH_{2n+1}$ | COOC$_m$H$_{2m+1}$ | H | H |
| nOCCF$_2$.F.F | $C_nH_{2n+1}$ | OCH$_2$CF$_2$H | F | F |

TABLE A

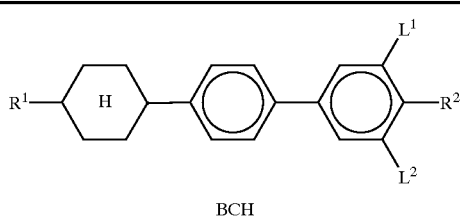

BCH

TABLE A-continued

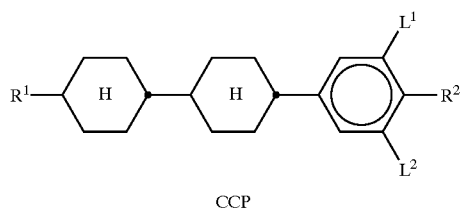

CCP

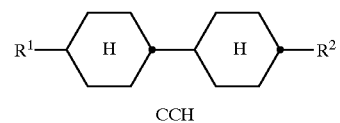

CCH

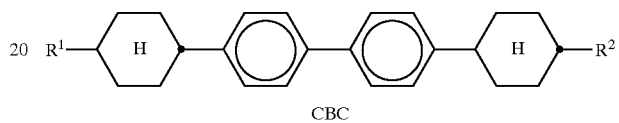

CBC

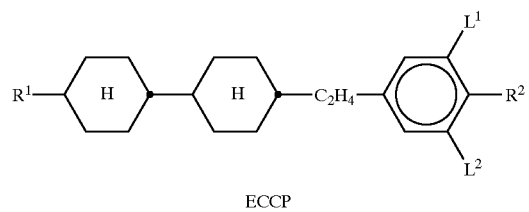

ECCP

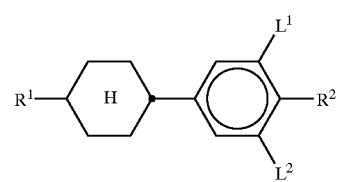

PCH

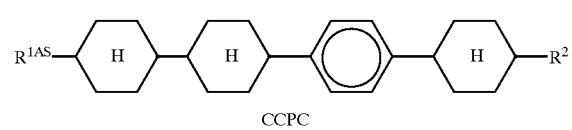

CCPC

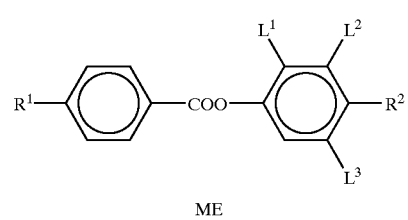

ME

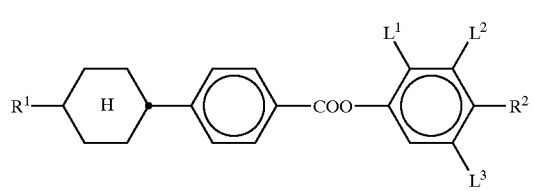

HP

TABLE B
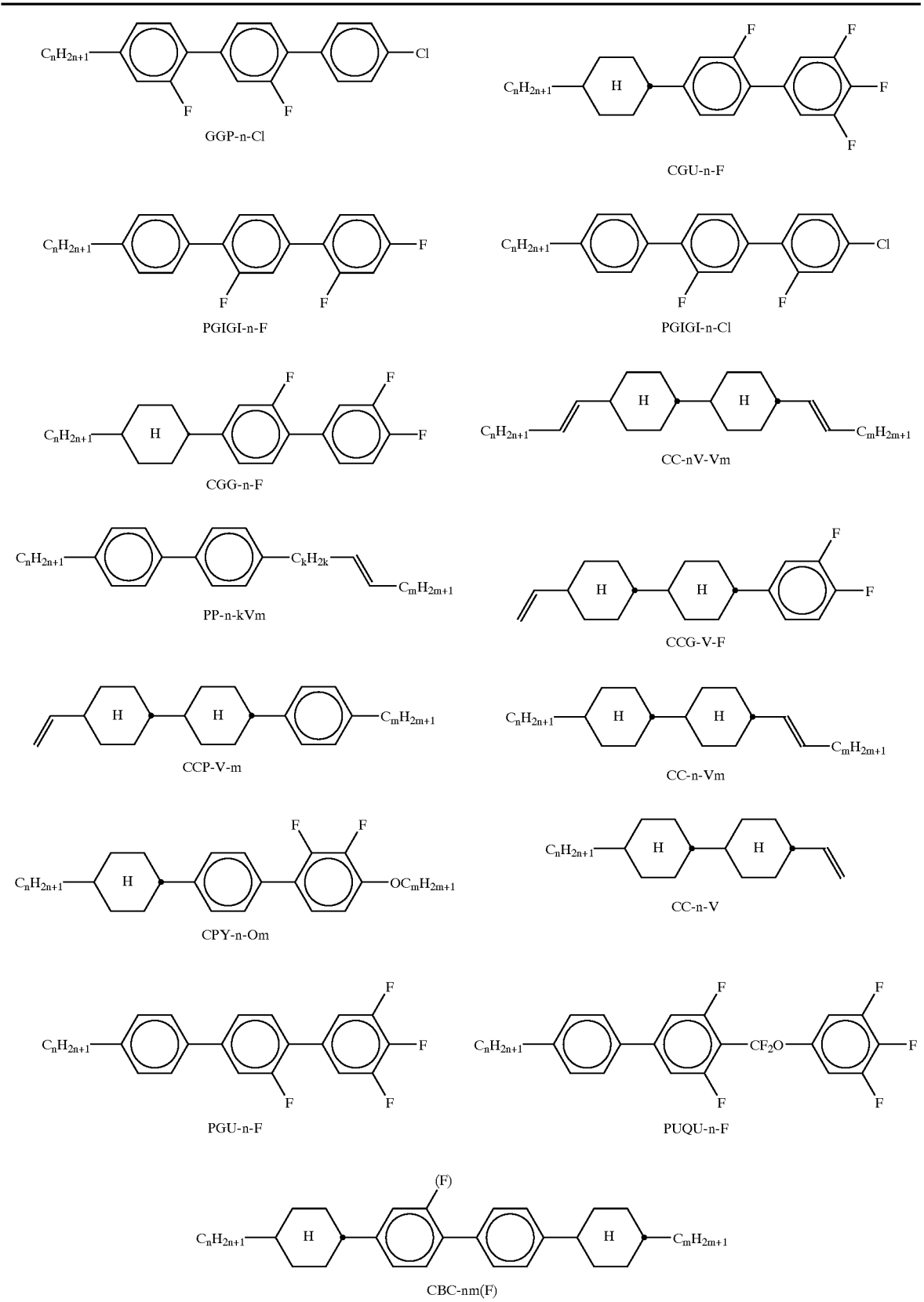

TABLE B-continued
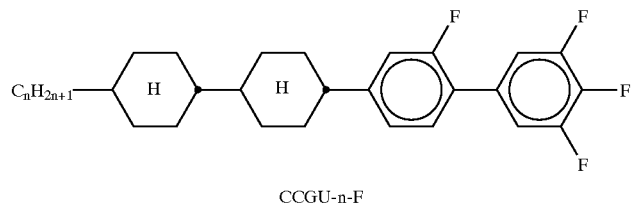
CCGU-n-F
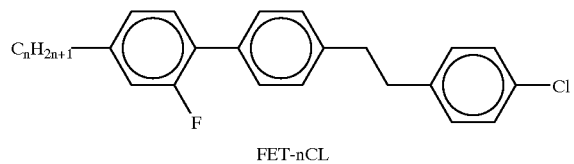
FET-nCL
TABLE C
Table C shows dopants which are usually employed in the mixtures according to the invention.
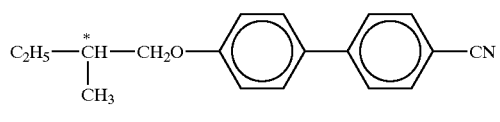
C 15
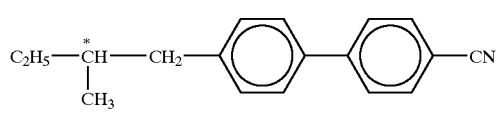
CB 15
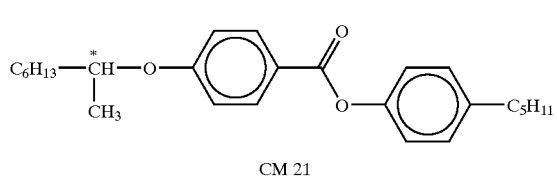
CM 21
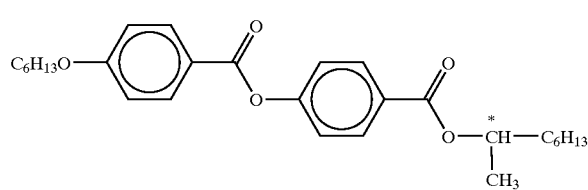
R/S-811
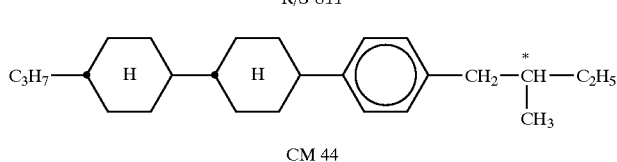
CM 44
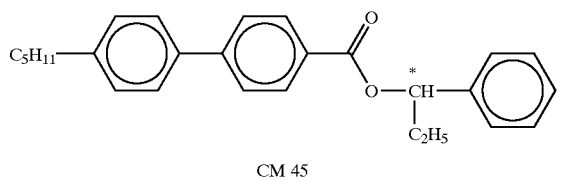
CM 45

TABLE C-continued
Table C shows dopants which are usually employed in the mixtures according to the invention.
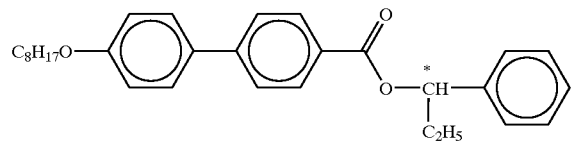
CM 47
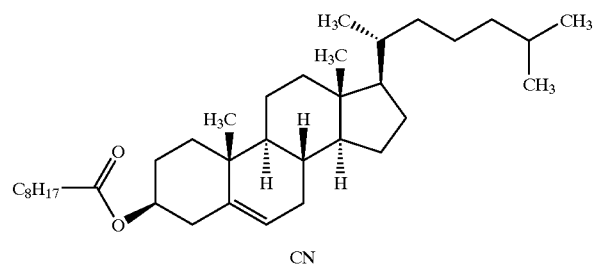
CN
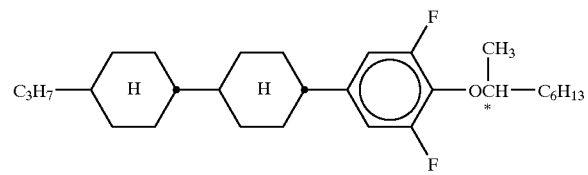
R/S-2011
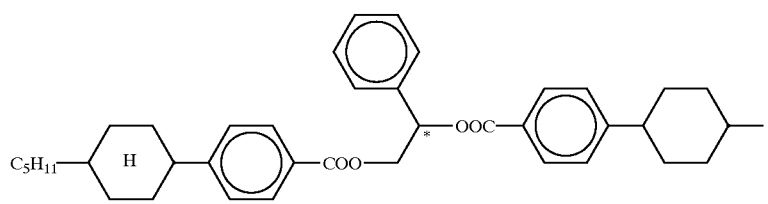
R/S-1011
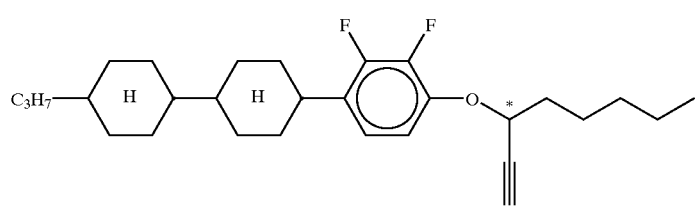
R/S-3011
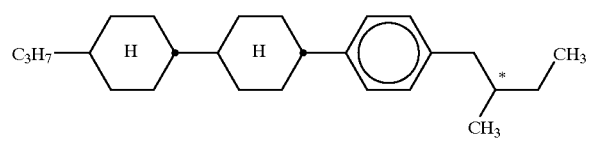

TABLE D
Stabilizers which can be added, for example, to the mixtures according to the invention are shown below.
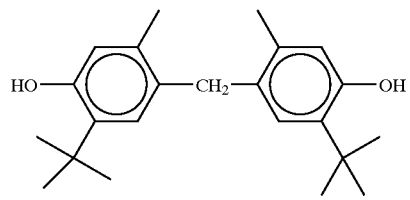 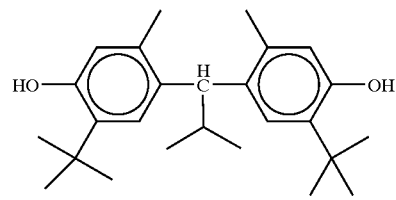
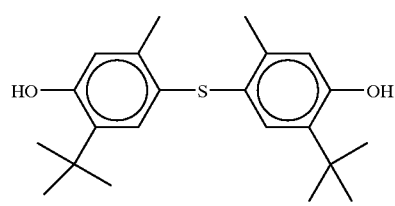 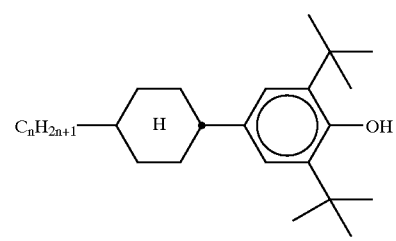
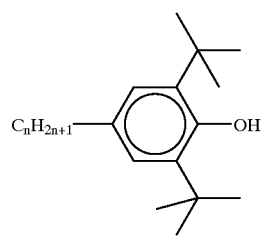 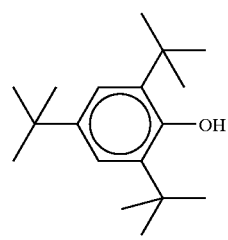
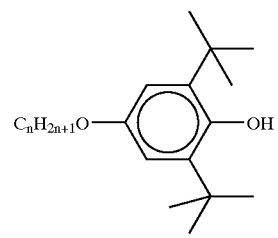 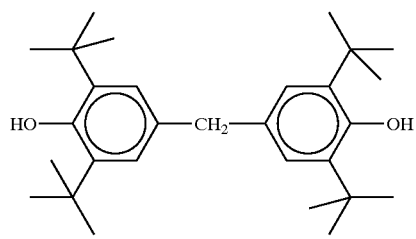
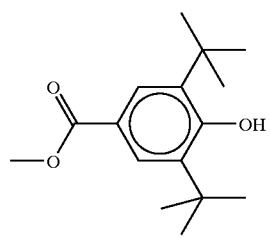 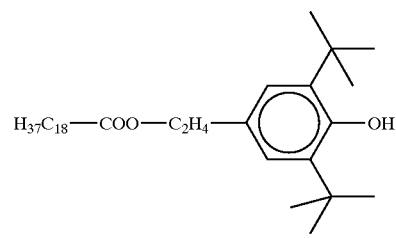
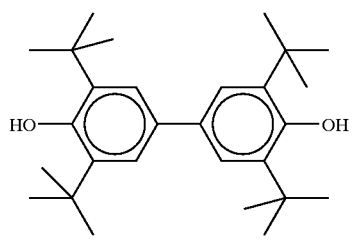

TABLE D-continued
Stabilizers which can be added, for example, to the mixtures according to the invention are shown below.
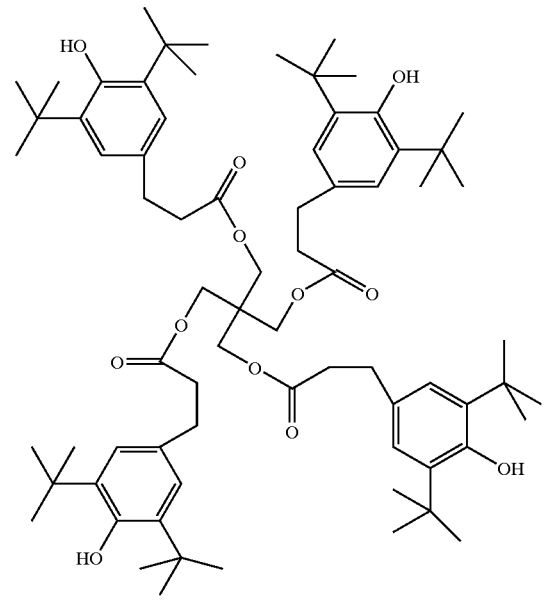
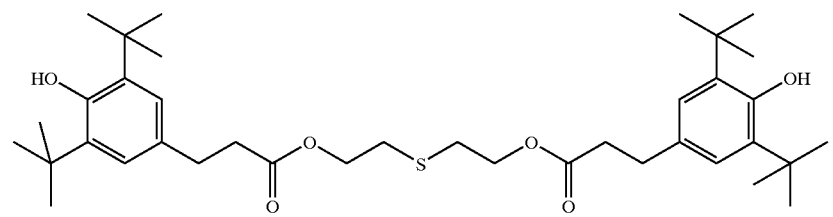
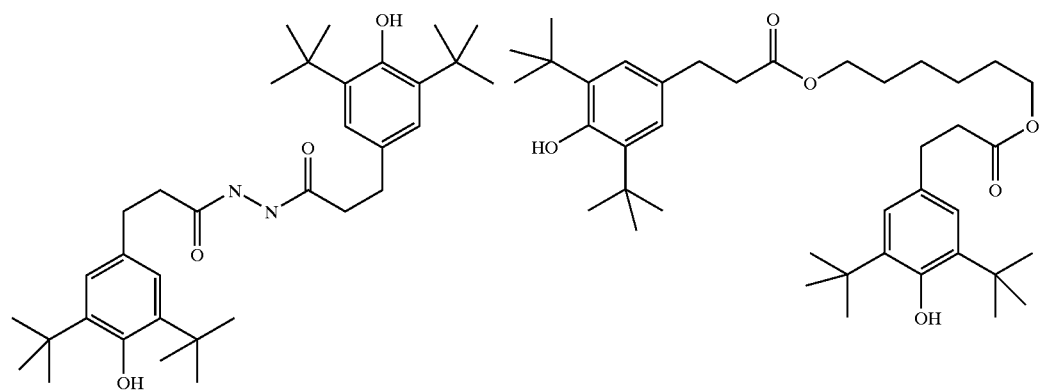

TABLE D-continued
Stabilizers which can be added, for example, to the mixtures according to the invention are shown below.
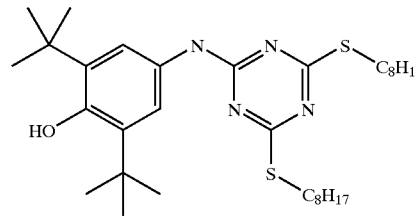
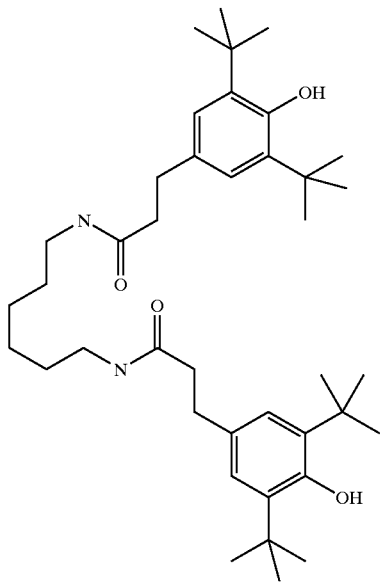
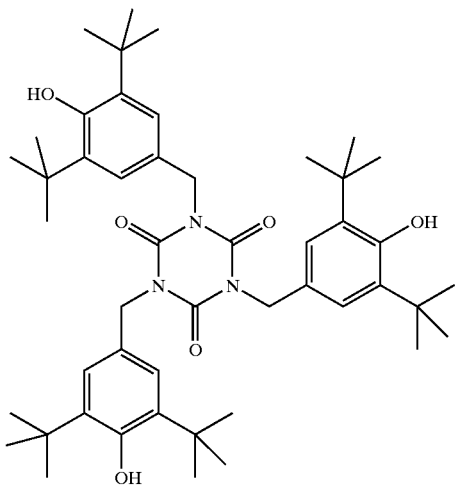
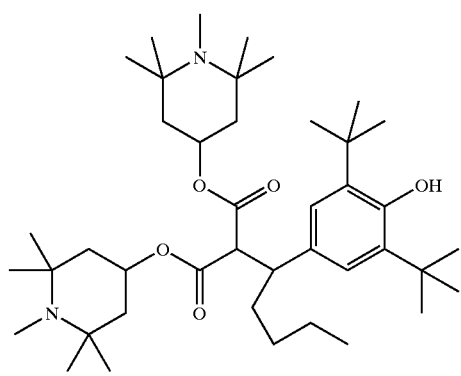
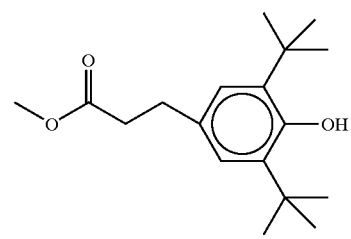
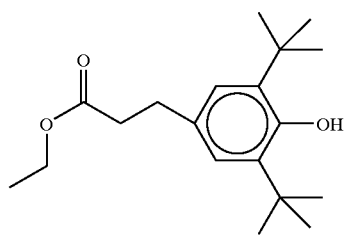
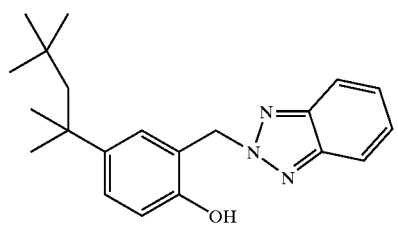

TABLE D-continued
Stabilizers which can be added, for example, to the mixtures according to the invention are shown below.
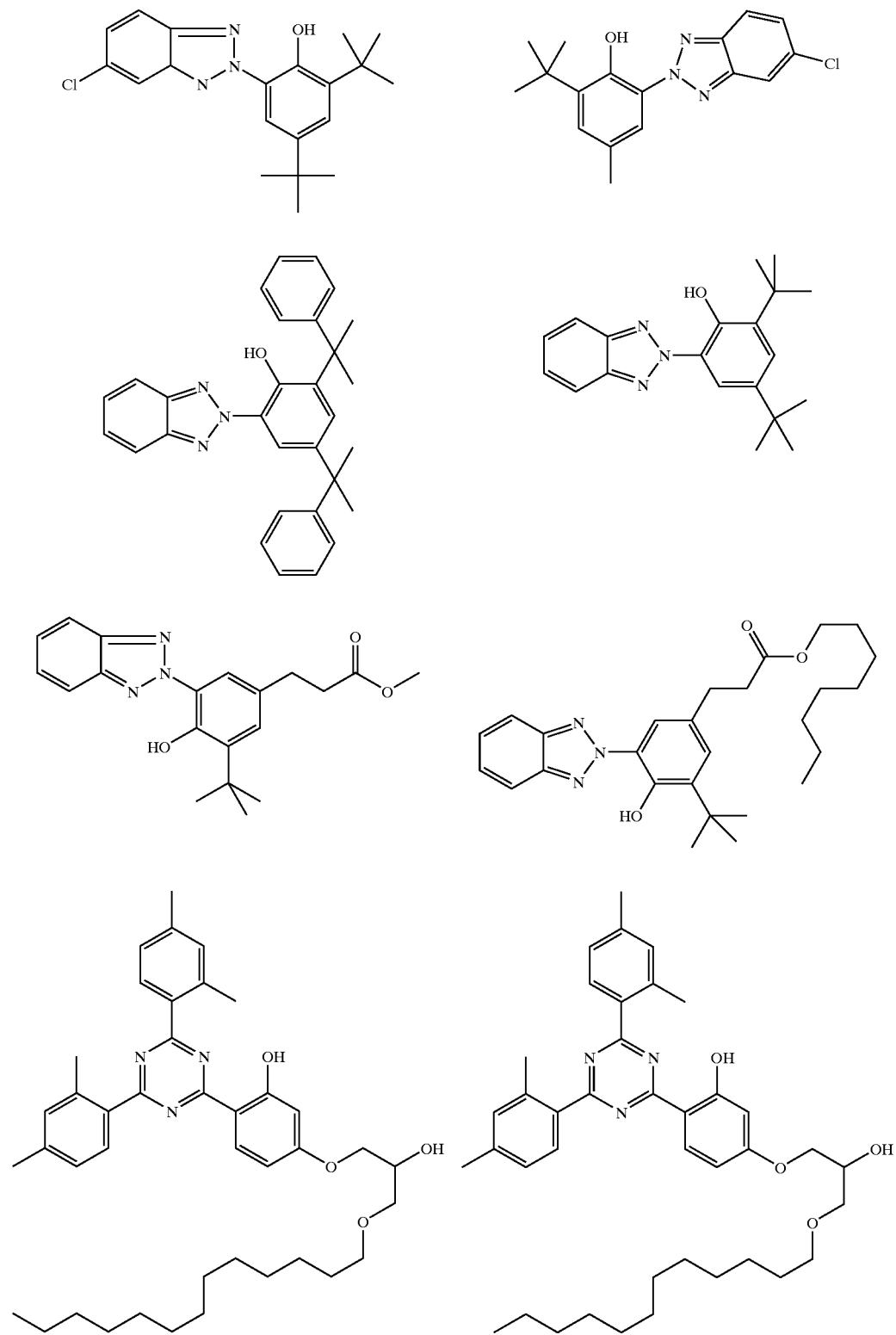

TABLE D-continued

Stabilizers which can be added, for example, to the mixtures according to the invention are shown below.

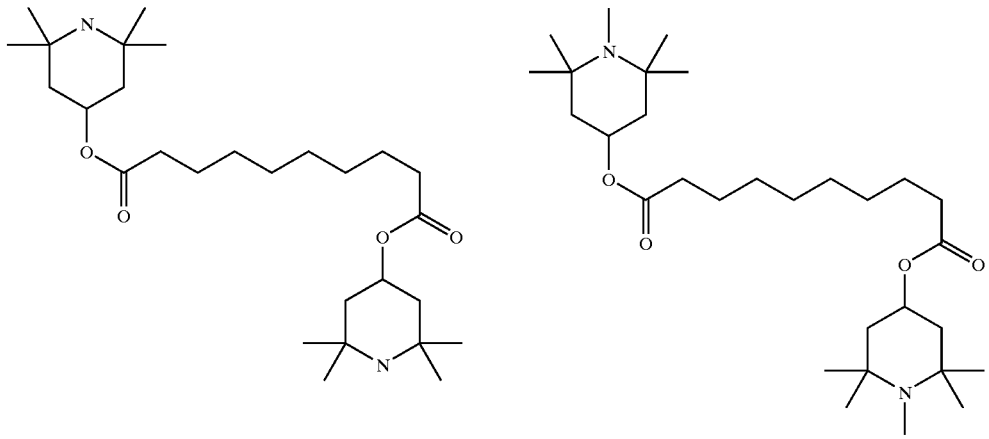

The following abbreviations are used:
Δn optical anisotropy at 20° C. and 589 nm
$n_e$ extraordinary refractive index at 20° C. and 589 nm
Δε dielectric anisotropy at 20° C.
$\epsilon_\perp$ dielectric constant perpendicular to the longitudinal molecular axis
cl.p. clearing point [° C.]
$\gamma_1$ rotational viscosity [mPa · s] at 20° C.

EXAMPLE 1

A liquid-crystal mixture is prepared from

| | | | |
|---|---|---|---|
| BCH-2F.F | 8.0% | cl.p. | 79.0 |
| BCH-3F.F | 8.0% | Δn | 0.1598 |
| BCH-5F.F | 6.0% | $\epsilon_\perp$ | 4.9 |
| PGU-2-F | 5.0% | Δε | +10.5 |
| PGU-3-F | 5.0% | $\gamma_1$ | 160 |
| PGU-5-F | 4.0% | | |
| PUQU-2-F | 4.0% | | |
| PUQU-3-F | 8.0% | | |
| GGP-3-CL | 8.0% | | |
| GGP-5-CL | 5.0% | | |
| CCP-V-1 | 5.0% | | |
| PGIGI-3-F | 10.0% | | |
| CC-3-V1 | 8.0% | | |
| CCG-V-F | 12.0% | | |
| CPY-3-O2 | 4.0% | | |

COMPARATIVE EXAMPLE 1

A liquid-crystal mixture is prepared from

| | | | |
|---|---|---|---|
| BCH-2F.F | 13.0% | cl.p. | 79.0 |
| BCH-3F.F | 13.0% | Δn | 0.1593 |
| BCH-5F.F | 13.0% | Δε | +10.6 |
| BCH-3F.F.F | 10.0% | $\gamma_1$ | 193 |
| BCH-5F.F.F | 9.0% | | |
| PGU-2-F | 7.0% | | |
| PGU-3-F | 7.0% | | |
| PGU-5-F | 4.0% | | |
| BCH-32 | 5.0% | | |
| CCG-V-F | 3.0% | | |
| CCP-V-1 | 2.0% | | |
| PCH-302 | 3.0% | | |
| PGIGI-3-F | 3.0% | | |
| GGP-5-CL | 8.0% | | |

With otherwise very similar values for the clearing point, the optical anisotropy and the dielectric anisotropy, it exhibits significantly higher rotational viscosity than the mixture according to the invention from Example 1.

EXAMPLE 2

A liquid-crystal mixture is prepared from

| | | | |
|---|---|---|---|
| GGP-3-Cl | 9.0% | cl.p. | 90.0 |
| GGP-5-Cl | 26.0% | Δn | 0.2078 |
| PGU-2-F | 11.0% | $n_e$ | 1.7182 |
| PGU-3-F | 11.0% | $\epsilon_\perp$ | 4.5 |
| PGU-5-F | 6.0% | Δε | +12.3 |
| CC-3-V1 | 10.0% | $\gamma_1$ | 251 |
| CCG-V-F | 10.0% | | |
| CPY-3-O2 | 2.0% | | |
| CPY-2-O2 | 3.0% | | |
| PGIGI-3-F | 10.0% | | |
| CBC-33F | 2.0% | | |

COMPARATIVE EXAMPLE 2

A liquid-crystal mixture is prepared from

| | | | |
|---|---|---|---|
| FET-2CL | 15.0% | cl.p. | 80.5 |
| FET-3CL | 6.0% | Δn | 0.2112 |
| FET-5CL | 19.0% | $n_e$ | 1.7349 |
| PGIGI-3-CL | 10.0% | $\epsilon_\perp$ | 4.2 |
| PGIGI-5-CL | 13.0% | Δε | +5.5 |
| PCH-301 | 10.0% | $\gamma_1$ | 297 |
| GGP-5-CL | 16.0% | | |
| BCH-3F.F | 11.0% | | |

With similar optical anisotropy, it exhibits lower values for the dielectric anisotropy and clearing point and higher rotational viscosity than the mixture according to the invention from example 2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds of positive dielectric anisotropy, including:

one or more compounds of the formula I

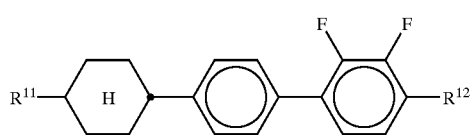

and one or more compounds of the formulae II and/or III

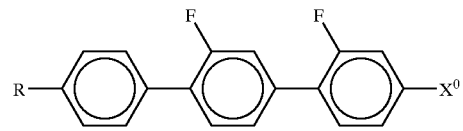

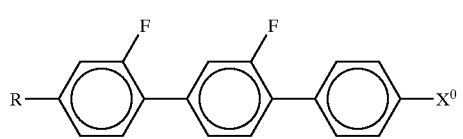

where $R^{11}$ is an alkyl or alkoxy radical having from 1 to 12 carbon atoms or an alkenyl radical having from 2 to 12 carbon atoms;

$R^{12}$ is an alkyl or alkoxy radical having from 1 to 12 carbon atoms or an alkenyl radical having from 2 to 12 carbon atoms;

R is an alkyl radical having from 1 to 12 carbon atoms, in which one or more $CH_2$ groups are optionally replaced by —O—, —S—, —CH=CH—, —C≡C—, —CO—, —OCO— or —COO— in such a way that the heteroatoms, —O— and/or —S— are not linked directly to one another;

$X^0$ is F, Cl, fluoroalkyl or fluoroalkoxy having from 1 to 7 carbon atoms.

2. A liquid-crystalline medium according to claim 1, further comprising one or more compounds of the formula IV

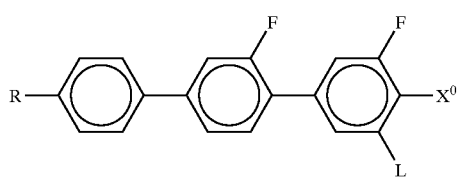

where

R and $X^0$ are, independently, as defined above; and

L is H or F.

3. A liquid-crystalline medium according to claim 1, further comprising one or more compounds of the formula V

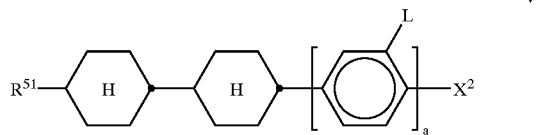

where $R^{51}$ is an alkenyl radical having from 2 to 12 carbon atoms;

$X^2$ is an alkyl or alkoxy radical having from 1 to 12 carbon atoms or an alkenyl or alkenyloxy radical having from 2 to 12 carbon atoms, in which one or more $CH_2$ groups are optionally replaced by —O—, —S—, —C≡C—, —CO—, —OCO— or —COO— in such a way that the heteroatoms, O— and/or —S—, are not linked directly to one another, or is a group $X^0$ as defined above;

a is 0 or 1; and

L is H or F.

4. A liquid-crystalline medium according to claim 2, further comprising one or more compounds of the formula V

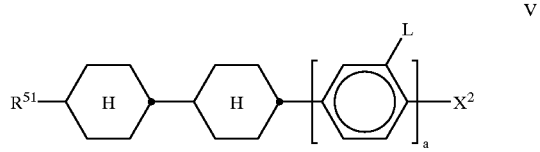

where $R^{51}$ is an alkenyl radical having from 2 to 12 carbon atoms;

$X^2$ is an alkyl or alkoxy radical having from 1 to 12 carbon atoms or an alkenyl or alkenyloxy radical having from 2 to 12 carbon atoms, in which one or more $CH_2$ groups are optionally replaced by —O—, —S—, —C≡C—, —CO—, —OCO— or —COO— in such a way that the heteroatoms, O— and/or —S—, are not linked directly to one another, or is a group $X^0$ as defined above;

a is 0 or 1; and

L is H or F.

5. A liquid-crystalline medium according to claim 1, further comprising one or more compounds of the formula VI

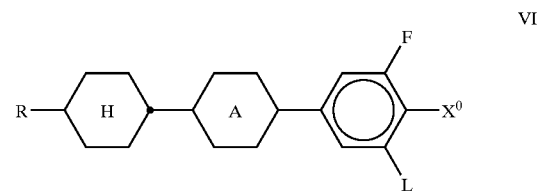

where

is a 1,4-cyclohexylene ring, or a 1,4-phenylene ring which is unsubstituted or substituted by 1 or 2 F atoms;

R and $X^0$ are, independently, as defined above; and

L is H or F.

6. A liquid-crystalline medium according to claim 2, further comprising one or more compounds of the formula VI

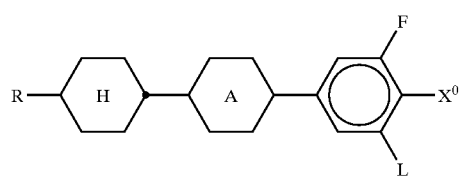
VI where

is a 1,4-cyclohexylene ring, or a 1,4-phenylene ring which is unsubstituted or substituted by 1 or 2 F atoms;

R and $X^0$ are, independently, as defined above; and

L is H or F.

7. A liquid-crystalline medium according to claim 3, further comprising one or more compounds of the formula VI

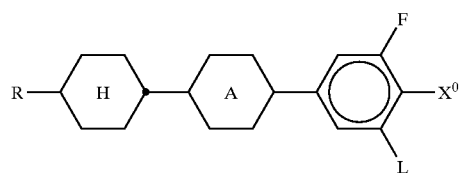
VI where

is a 1,4-cyclohexylene ring, or a 1,4-phenylene ring which is unsubstituted or substituted by 1 or 2 F atoms;

R and $X^0$ are, independently, as defined above; and

L is H or F.

8. A liquid-crystalline medium according to claim 4, further comprising one or more compounds of the formula VI

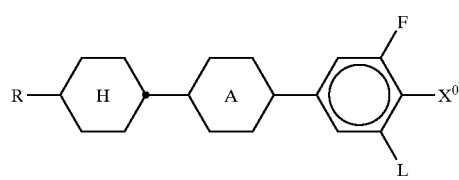
VI where

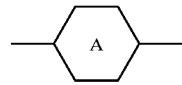

is a 1,4-cyclohexylene ring, or a 1,4-phenylene ring which is unsubstituted or substituted by 1 or 2 F atoms;

R and $X^0$ are, independently, as defined above; and

L is H or F.

9. A liquid-crystalline medium according to claim 1, further comprising one or more compounds of the formula VII

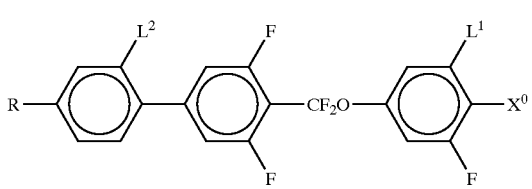
VII where

R and $X^0$ are, independently, as defined above; and $L^1$ and $L^2$, independently of one another, are H or F.

10. A liquid-crystalline medium according to claim 2, further comprising one or more compounds of the formula VII

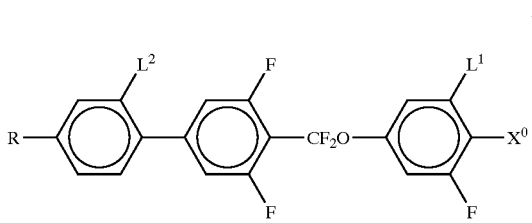
VII where

R and $X^0$ are, independently, as defined above; and $L^1$ and $L^2$, independently of one another, are H or F.

11. A liquid-crystalline medium according to claim 3, further comprising one or more compounds of the formula VII

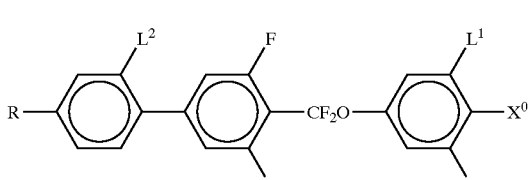
VII where

R and $X^0$ are, independently, as defined above; and $L^1$ and $L^2$, independently of one another, are H or F.

12. A liquid-crystalline medium according to claim 4, further comprising
one or more compounds of the formula VII

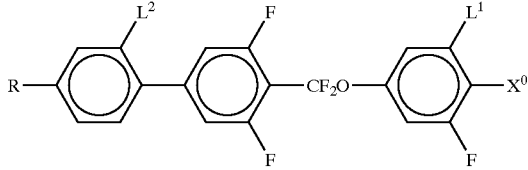

VII where
R and $X^1$ are, independently, as defined above; and
$L^1$ and $L^2$, independently of one another, are H or F.

13. A liquid-crystalline medium according to claim 5, further comprising
one or more compounds of the formula VII

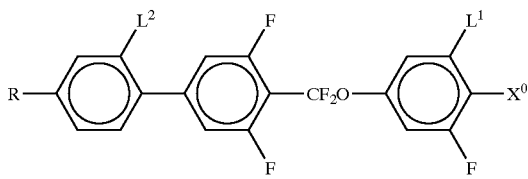

VII where
R and $X^0$ are, independently, as defined above; and
$L^1$ and $L^2$, independently of one another, are H or F.

14. A liquid-crystalline medium according to claim 8, further comprising
one or more compounds of the formula VII

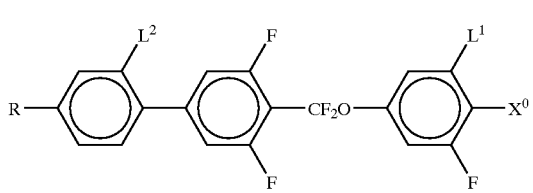

VII where
R and $X^0$ are, independently, as defined above; and
$L^1$ and $L^2$, independently of one another, are H or F.

15. A liquid-crystalline medium according to claim 1, where $R^{12}$ in the compounds of the formula I is an alkoxy radical having from 1 to 7 carbon atoms.

16. A liquid-crystalline medium according to claim 2, where $X^0$ in the compounds of the formula IV is F, $OCF_3$.

17. A liquid-crystalline medium according to claim 1, where the medium comprises from 1 to 20% by weight, based on the total amount of the medium, of one or more compounds of the formula I.

18. A liquid-crystalline medium according to claim 2, where the medium comprises from 3 to 40% by weight (based on the total amount of the medium) of one or more compounds of the formula IV.

19. An electro-optical liquid-crystal display or projection system containing a liquid-crystalline medium according to claim 1.

20. An electro-optical liquid-crystal display or projection system in LCoS or OCB mode containing a liquid-crystalline medium according to claim 1.

* * * * *

UNITED STATES PATENT AND TRADEMARK OFFICE
CERTIFICATE OF CORRECTION

PATENT NO. : 6,846,523 B2  Page 1 of 1
DATED : January 25, 2005
INVENTOR(S) : Atsutaka Manabe It is certified that error appears in the above-identified patent and that said Letters Patent is hereby corrected as shown below:

Column 43,
Line 17, replace "$X^1$" with -- $X^0$ --.

Column 44,
Line 20, after "F", insert -- Cl --.

Signed and Sealed this

Sixth Day of December, 2005

JON W. DUDAS
*Director of the United States Patent and Trademark Office*